Figure 1:
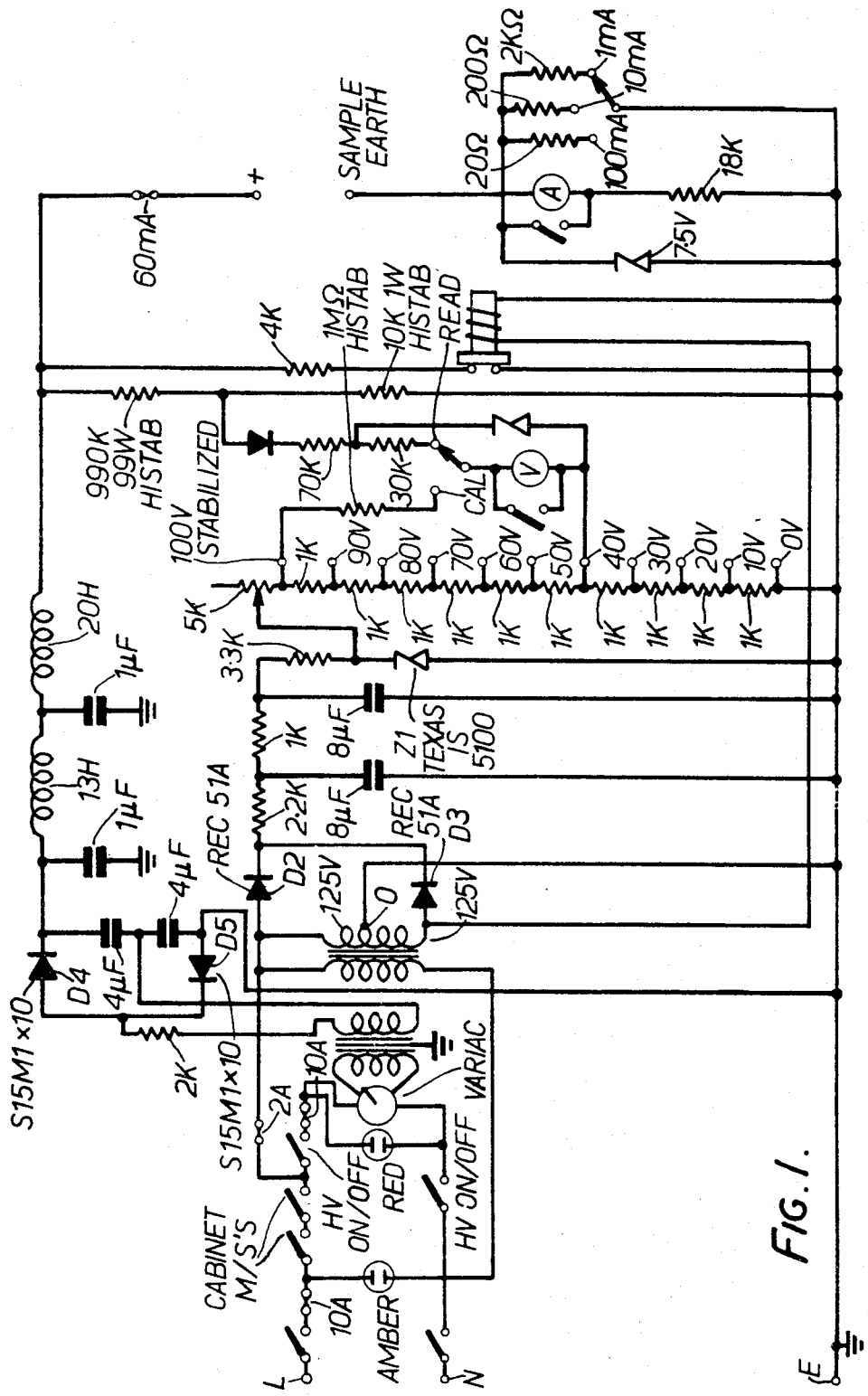

United States Patent [19]

Penneck et al.

[11] Patent Number: 4,470,898
[45] Date of Patent: Sep. 11, 1984

[54] POLYMER COMPOSITIONS FOR ELECTRICAL USE

[75] Inventors: Richard J. Penneck, Lechlade; Paul Taylor, Burton, both of England

[73] Assignee: Raychem Limited, London, England

[21] Appl. No.: 904,736

[22] Filed: May 11, 1978

Related U.S. Application Data

[63] Continuation of Ser. No. 671,343, Mar. 29, 1976, abandoned, which is a continuation of Ser. No. 453,165, Mar. 20, 1974, abandoned.

[30] Foreign Application Priority Data

Mar. 20, 1973 [GB] United Kingdom ............... 13352/73

[51] Int. Cl.³ .............................................. H01B 1/06
[52] U.S. Cl. .................................... 252/511; 252/512; 252/513; 252/514; 252/518; 252/519; 252/520; 252/521; 174/68 A
[58] Field of Search ............... 252/511, 512, 518, 519, 252/520, 513, 514, 521; 174/73 SC, 68 A, 137 B

[56] References Cited

U.S. PATENT DOCUMENTS

| | | | |
|---|---|---|---|
| 2,730,597 | 1/1956 | Podolsky et al. | 252/511 X |
| 2,795,680 | 6/1957 | Peck | 252/511 X |
| 2,861,163 | 11/1958 | Asakawa | 252/511 X |
| 2,964,476 | 12/1960 | Coad | 252/511 X |
| 3,259,531 | 7/1966 | Lofberg | 149/19.9 |
| 3,342,752 | 9/1967 | Wada | 252/511 |
| 3,686,139 | 8/1972 | Lubin | 252/511 |
| 3,849,333 | 11/1974 | Lloyd | 252/511 |
| 3,950,604 | 4/1976 | Penneck | 174/68 A |

Primary Examiner—Josephine Barr
Attorney, Agent, or Firm—Lyon & Lyon

[57] ABSTRACT

Novel polymeric compositions having non-linear resistance characteristics, together with electrical equipment comprising such compositions. Any polymer may be used; the polymer contains substantial proportions of certain particulate fillers of a given structure, for example the perovskite and spinel structures.

31 Claims, 32 Drawing Figures

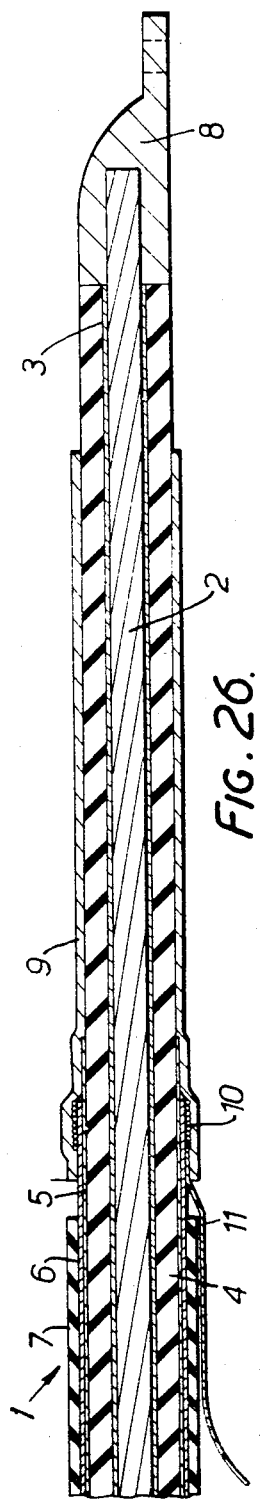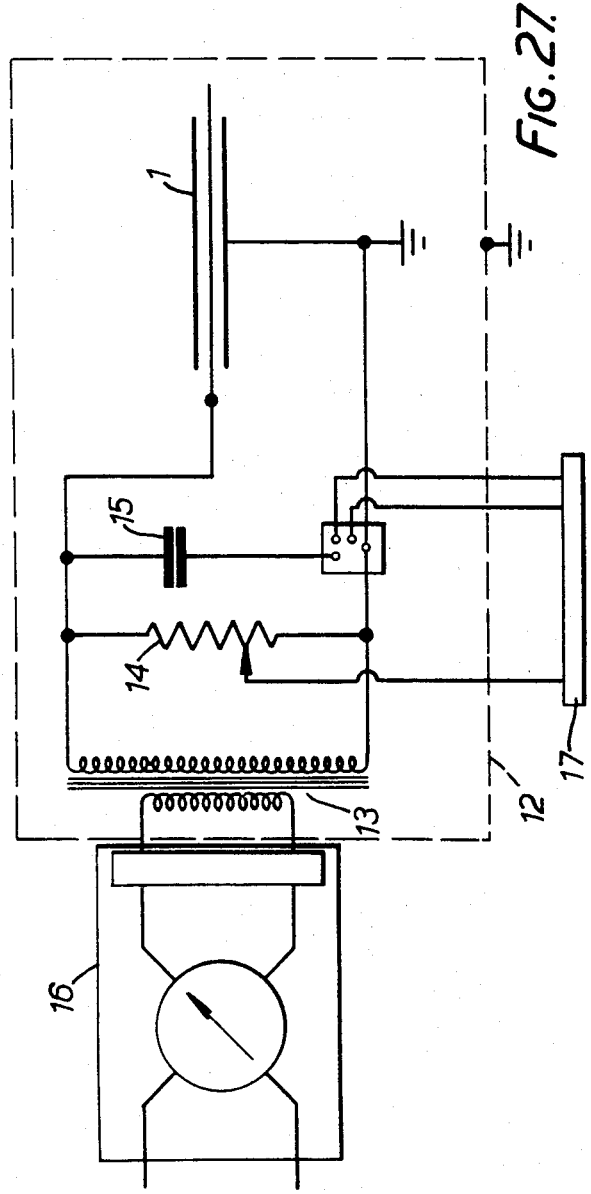

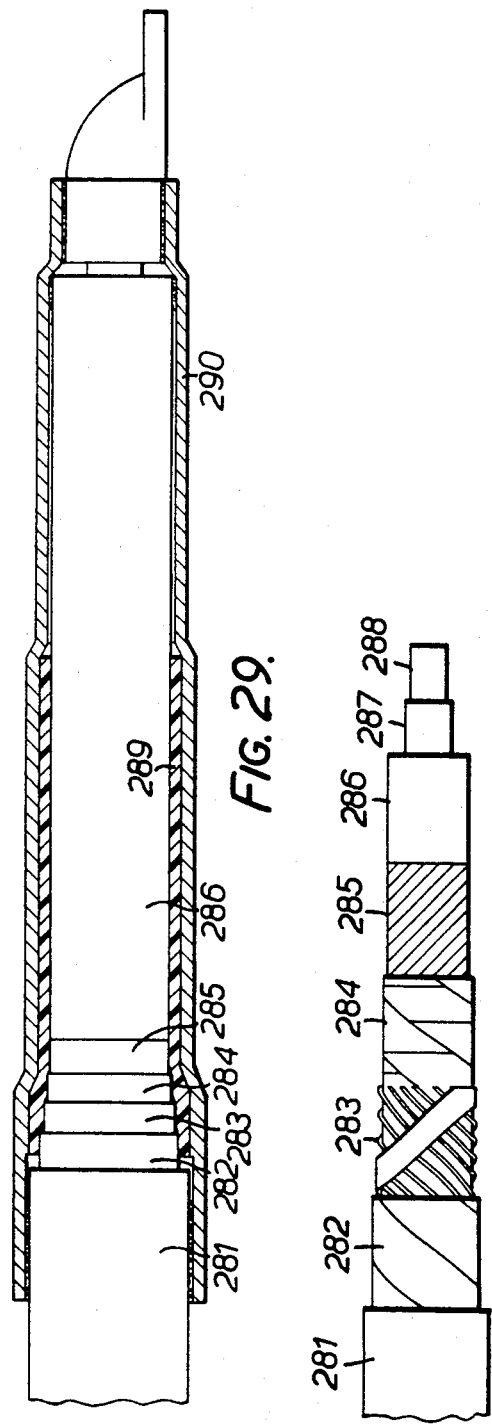

POLYMER COMPOSITIONS FOR ELECTRICAL USE

This is a continuation of application Ser. No. 671,343 (now abandoned), filed Mar. 29, 1976, which is a continuation of Ser. No. 453,165, Mar. 20, 1974 abandoned.

This invention relates to polymer compositions for electrical use.

In a continuously shielded or screened high voltage cable, the electric field is uniform along the cable axis, and there is variation in the field only in the radical direction. The spacing of the electric flux lines and the equipotential lines are closer in the region of the conductor than elsewhere, as shown by the following equation:

$$Ex = \frac{Vo}{x \ln(R/r)}$$

where Ex = electrical stress at point x, in volts/mil
x = distance from centre of cable in mils
Vo = applied voltage in volts
R = radius of cable over insulation
r = radius of cable conductor Thus the stress is a function of the geometry of the cable and in practice the insulation thickness is sufficient to maintain the stresses at acceptable levels for the dielectric concerned.

When such a cable is terminated, the screen or shield is removed for such a distance that electrical breakdown along the surface of the insulation from the conductor to the shield or screen cannot occur. The removal of this screen or shield causes discontinuity of the electrical field so that there is severe electrical stress at the point of the end of this screen or shield. In order to relieve this stress and so prevent failure of the cable and termination in service, a number of methods have been developed to provide adequate stress control. Among these methods may be mentioned the use of stress cones (pre-moulded of fabricated type), resistivve coatings and non linear tapes.

Stress cones extend the shield or screen of the cable by the use of a conducting material such as wire, metal foil or tapes on part of the surface of an insulating cone. The cone may be made from tapes of plastic or paper, epoxy resins, rubbers etc. Stress cones thus expand the diameter of the cable at the discontinuity and hence reduce the stress. They thus require considerable space over and above the cable diameter and usually require skill and time during fabrication on the cable.

Pre-moulded stress cones of the slip-on type may also be used, but their interference fit characteristics mean that both cable and cone have to be made to close tolerance for optimum performance. It has also been proposed to make stress cones by the build up of layers of different lengths of heat shrinkable tubing, but such cones are not very practical as this method is very time consuming and introduces the possibility of interlaminar voids.

Resistive coatings on the surface of the insulation from the conductor to the shields will reduce the stress by conducting sufficient current to establish a substantial linear distribution of voltage. The high resistance necessary to achieve this and to avoid dissipating an excessive amount of power is rather critical and must remain a constant value in service in order to be satisfactory. This is very difficult to achieve in practice and such coatings are not now in general use.

Coverings of performed sleeves, wrapped tapes such as those based on PVC, or dry coatings, having a non linear electrical resistance characteristic, have also been proposed to provide stress control. These coverings have the disadvantage that, in general, effective stress control is obtained only by careful and skilful application of the covering and that the materials age rapidly at elevated temperatures, such that cracking occurs in the coating layer thereby destroying the effectiveness of the stress control.

It has been proposed also to use, as a material having non-linear electrical resistance characteristics, a potentially heat shrinkable polymer having dispersed therein particulate silicon carbide. The material may be processed into a heat shrinkable article, for example a tube, by moulding or extrusion coupled with the usual procedures for making polymers heat shrinkable (see for example U.S. Pat. Nos. 2,027,962 and 3,086,242). Silicon carbide has the disadvantages that, in the form of the very fine particles preferably used, it is expensive and that, at the relatively high loadings required, for example 40% by volume based on the polymer, processing problems arise on account of the fact that silicon carbide is very abrasive; this may cause considerable wear of process equipment such as internal mixers, two-roll mills, extrusion dies, etc. Furthermore, the non-linear electrical resistance characteristics of the silicon carbide loaded polymers of the prior art cannot be widely varied.

By the term "non-linear electrical resistance", there is meant that the electrical resistance of the material in question varies with voltage across the material i.e. the current I flowing through the material when a voltage V is applied across the material substantially obeys the relationship: $I = KV^\gamma$ where K is a constant and $\gamma$ is a constant greater than 1. For linear materials, $\gamma$ is equal to 1.

Thus, there is a need to provide materials which can be used to effect stress control on the surfaces of high voltage insulation without the disadvantages of the articles of the prior art.

According to the invention, there is provided electrical apparatus, likely to be subjected in use to high electrical stresses, including a stress control material having non-linear electrical resistance characteristics, said material including a polymeric material having dispersed therein one or more particulate compounds selected from the group consisting of:

(i) Compounds having a perovskite type crystal structure.
(ii) Compounds having a spinel crystal structure other than $\gamma$-$Fe_2O_3$ and spinel itself.
(iii) Compounds having an inverse spinel crystal structure.
(iv) Compounds having a mixed spinel crystal structure.
(v) Dichalcogenides of transition metals.
(vi) Ferro electrical materials such as AgI, Prussian Blue, Rochelle salt and related tartrates, compounds of the formula $XH_2YO_4$ wherein X is K, Rb or Cs and Y is P or As, for example potassium dihydrogen phosphate, $(NH_4)_2SO_4$; ammonium fluoroberyllate, thiourea and triglycene sulphate.
(vii) $Si_3N_4$, the said particulate compound being present in an amount of at least 10% by weight based on the polymer, and in an amount such that the value of $\gamma$ at some stress between 0.01 kV/mm and 10 kV/mm is at least 1.5. Preferably the value of $\gamma$ is at least 1.5 at a stress below 5 kV/mm.

In addition to the material listed in (i) to (vii) above, the material may comprise one or more particulate electrically conductive fillers.

As compounds of the type (i) above, there may be mentioned, for example, compounds having the general formulae:

(a) $ABO_3$ wherein A represents Ca, Sr, Ba, Pb, Mg, Zn, Ni or Cd and B represents Ti, Zr, Hf, Sn, Ce or Tc or A represents a rare earth metal and B represents Al, Se, V, Cr, Mn, Fe, Co or Ga, (b) $KBF_3$ wherein B represents Mg, Cr, Mn, Fe, Co, Ni, Cu or Zn, or (c) $ATiS_3$ wherein A represents Sr or Ba, and $AZrS_3$ wherein A represents Ca, Sr, Ba.

There may be especially mentioned $BaTiO_3$, $BaSnO_3$ and $SrTiO_3$ and the following, which are preferably used in admixture with a particulate conductive filler: $BaZrO_3$, $CaTiO_3$, $CaSnO_3$, $CaZrO_3$, $MgSnO_3$, $PbSnO_3$, $MgZrO_3$, $NiTiO_3$ and mixed Zinc Titanate.

As compounds of the type (ii) there may be mentioned, for example, compounds having the general formulae:

(d) $A''B_2'''O_4$ wherein A represents Mg, Mn, Fe, Co, Ni, Cu, Zn or Cd etc. and B represents Al, Cr, Fe, Mn, Co or V, provided that when A represents Mg, B cannot represent Al, or (e) $A''B''_2 O_4$ wherein $A''$ represents Ti or Sn and B represents Zn or Co, Ni, Mn, Cr, Cd.

There may be especially mentioned $CoAl_2O_4$, $CuCr_2O_4$, $CuMn_2O_4$, $CuFe_2O_4$, $CoFe_2O_4$, $ZnFe_2O_4$, Barium and strontium ferrites (e.g. $BaFe_{12}O_{19}$) which are of the magneto plumbite structure (a type of depleted spinel) are also suitable.

As compounds of the type (iii) there may be mentioned, for example, (f) $Fe'''(Mg''Fe''')O_4$, $Fe'''(Ni''Fe''')O_4$, $Fe'''(Cr''Fe''-)O_4$, $Co''(Co''Sn^{iv})O_4$, $In'''(Mg''In''')O_4$, $Zn''(Zn''Ti^{iv}-)O_4$, $Zn''(Zn''Sn^{iv})O_4$, $Li_2V_2O_4$, $Fe_{2.5}Li_{0.5}O_4$ and, especially, $Mn_3O_4$, $Co_3O_4$, $Fe_3O_4$ and slightly non-stoichiometric variants thereof, for example $Fe_2O_3.0.8FeO$.

As compounds of the type (iv) there may be mentioned, for example, Bayer Fast Black 100 (which results from sintering 50% by weight $Cr_2O_3$, 40% by weight $Fe_2O_3$ and 10% by weight CuO), Bayer 303T (a mixed phase pigment of about 2/3 $Fe_2O_3$ and 1/3 $MnO_2$), Harrison Meyer Black (An Fe-Co-Ni mixed oxide) and Columbian Mapico Black (a synthetic magnetite of about 22% FeO and 77% $Fe_2O_3$).

As compounds of the type (v) there may be especially mentioned, for example, $MoS_2$, $MoSe_2$, $MoTe_2$, $WS_2$, $MnO_2$, $FeS_2$, $SnO_2$ and $CrO_2$.

$Si_3N_4$ and $CoAl_2O_4$ mentioned above are preferably used in admixture with a particulate, conductive filler.

As conductive particulate fillers there may be mentioned for example, carbon blacks, metallic powders, for example aluminium, chromium, copper, bronze, brass, iron, stainless steel, lead, silver, manganese, zinc, Ni/Al and nickel powders, and particulate platinized- or palladized-asbestos, -silica, -alumina and -charcoal.

The compounds may also be used in admixture with silicon carbide particles.

The proportion of particulate compounds and fillers may be widely varied, depending on (a) the electrical properties required of the material, (b) the chemical nature of the compound and filler and (c) the chemical nature of the polymer. The desired proportion may be determined relatively simply by experimentation. In general, the particulate compound will be present to at least 10% by weight of the polymer and more particularly the weight ratio of particulate compound to polymer will be within the range of from 100 to 500:100. The conductive particulate filler will generally be used in a concentration up to a maximum of 40 parts in the case of carbon black and of 100 parts in the case of metal powders relative to 100 parts by weight of polymer provided that $\gamma$ is always greater than one. Typical values for the conductive particulate filler are in the region 10–25 parts (carbon black) and 50 to 100 (metal powder) per 100 parts of polymer.

The particle sizes of the particulate compounds are preferably below about $20\mu$, more preferably below about $5\mu$. Especially if the material is to be processed into a heat-shrinkable article, as described hereinafter, generally the smaller the particle size the better are the physical properties of the article.

The basic polymeric material may be selected from a large range of polymers. Blends of two or more polymers may be desirable in some cases and the polymers selected will depend at least to a certain extent on the purpose to which the material is to be put. Examples of polymers suitable either alone or in blends are as follows:

Polyolefins, including copolymers of ethylene with propylene, butene, methylacrylate, ethyl acrylate, methyl methacrylate, ethyl methacrylate, vinylacetate, vinyl chloride, vinyl propionate, carbon monoxide, maleate, fumarate and itaconic esters, terpolymers of ethylene, vinyl acetate and olefinic unsaturated mono carboxylic acid such as acrylic or methacrylic acid. The partially neutralized varieties of these polymers such as the ionomeric resins which are the ammonium or alkali or alkaline earth metal derivatives: polyvinyl chloride, vinyl chloride copolymers containing as comonomer, vinyl acetate, vinylidene fluoride, dialkyl maleate, or fumarate, natural rubber, synthetic rubbers such as butyl, neoprene, ethylene propylene rubber and the ethylene propylene non conjugated diene terpolymers, silicone rubbers, including those derived from dimethyl siloxane, diphenyl siloxane, methylphenyl siloxane, or methyl phenyl vinyl siloxane or the so-called mono methyl resins such as the Dow Corning 96083, copolymers of siloxanes with carboranes as un the Dexsil series of resins, copolymers of siloxanes with styrenes etc; fluoro carbon plastics and rubbers including polyvinylidene fluoride, copolymers of vinylidene fluoride and hexafluoropropylene, terpolymers of vinylidene fluoride, hexafluoropropylene and tetrafluoroethylene, copolymers of vinylidene fluoride and 1-hydropentafluoro propene or a terpolymer containing these monomers plus tetrafluoroethylene, etc., nitrile rubbers, acrylate rubbers, and polysulphide rubbers.

In addition, chemically modified versions of these or other polymers are also eminently suitable, for example, chlorinated polyethylene, chlorosulphonated polyethylene (Mypalon), chlorinated rubber. Other suitable polymers include polyurethane elastomers and plastics, polyesters such as the Hytrel rubbers from DuPont, polyethers, epichlorohydrin rubbers, epoxy resins, dodecamethylene polypyromellitimide, block copolymers such as the kraton rubbers which are styrene, butadiene, styrene blocks or the analogous styrene isoprene, styrene blocks, are also suitable. In addition, polymers based on ethylene oxide are also suitable. These polymers may contain one or more conventionally used additives, for example, processing aids, plasticizers, stabilizers, antioxidants coupling agents, further modified or unmodified fillers and/or cure systems.

The present invention also provides certain novel stress control materials suitable for use in electrical apparatus of the invention.

The materials may be manufactured by normal compounding methods, for example using internal mixers of the Banbury type, compounding mixer extruders, twin-roll mills, or high speed solvent mixers of the Silverson type or Sigma-bladed solvent mixers of the Baker Perkins type.

The material may be in the form of a shaped article, for example in the form of a tape, film, extruded tubing or moulded article or in the form of a dispersion or solution thereof in a liquid, for example as a paint or varnish which paint or varnish which will, on drying, leave a coating of the material on the equipment to which the paint or varnish has been applied. Preferably the article of the invention is capable of changing shape when heated. The article, for example extruded tubing, may be mechanically shrinkable and in such a case the article will have to be of a resilient material. A preferred mechanically shrinkable article comprises for example, tubing maintained in a radially extended state by an internally disposed spiral of a stiff member, removal of the member causing the tubing to return to the original size and shape whereby it may be recovered onto an electrical apparatus.

Mechanically extendable articles may be extended immediately prior to application thereof to electrical apparatus using, for example, pliers or forceps.

In all cases the polymeric material is preferably cross-linked. More preferably the article is heat recoverable or is capable of being rendered heat recoverable or is dimensionally unstable. In such a case the article will generally be extruded tubing, extruded tape or a moulded component.

By the term "heat recoverable article", there is meant an article which retains its dimensions under low or normal temperature conditions, but at least one dimension of which is reduced upon heating to a critical temperature.

If the article is to be heat-shrinkable, the article is preferably made of suitable cross-linked or cross-linkable polymer. Especially suitable polymers are those heat-shrinkable polymers or polymer combinations described in our co-pending British Patent Application Nos. 40752/72, now, respectively, British Pat. Nos. 1,433,129 and 1,294,665 and 1,434,719, 4663/69 and 40751/72. The article may be rendered heat shrinkable by conventional methods, thus the material construction is firstly fabricated and is then cross linked, for example by irradiation with $\beta$ or $\gamma$ irradiation or by chemical means. The article is then expanded by the desired amount at a temperature at or above the said critical temperature and the article is then cooled to a temperature below said critical temperature while maintaining it in the expanded state. The articles of the invention have for example, the following applications:

(i) Insulation for electric cables, where this insulation is situated between the conductor and the primary dielectric or between the screen of the cable and the primary dielectric. In the latter case an especially advantageous situation arises, in that the high voltage cable does not need a normal termination.

(ii) Insulation for electric cables as in the layered construction described in U.S. Pat. No. 3,666,876.

(iii) Stress control coverings for electrical cable terminations. Such stress control means may be in the form of coatings, moulded parts, tubing or tape and may be used with or without an external protective layer, as necessary.

(iv) Stress control coverings for stator-bar ends or the ends of insulated electrical conductors in machines.

(v) Stress control components in lightning arrestors.

(vi) Attachments to aircraft wings to dissipate static.

(vii) As components of insulator bodies where the material may be the outer layer or an internal component, provided that it is non-tracking in service; thus it could be used for sheds or tubing to provide insulators for tension suspension, post or bushing insulators. Suitable resins in which the fillers of this invention are used for this application are preferably the silicone resins and especially the silicone methyl methacrylate block copolymer, polydimethyl siloxane elastomers and the so-called mono methyl silicone resins.

(viii) Electric switches or gates, i.e. an electrical device which remains insulating until a critical electrical stress is applied across it, whereupon the device undergoes a major increase in conductivity.

(ix) As components of carbon-black loaded polymeric conductive compositions to prevent local overheating caused by variations in composition or manufacturing techniques. Such compositions form the heating element of a linear heating strip having a pair of longitudinal electrodes, one at each edge of the strip; if a longitudinal strip between the electrodes has a higher resistance than the remainder it tends to overheat; the higher stress caused by the higher resistance portion results, however, in a higher conductivity of the materials of the invention, thus giving some degree of negative feedback.

EXAMPLE 1

The following substances were mixed together in a twin roll laboratory mill at about 110° C.

|  | Parts by weight |
|---|---|
| Royalene 611 (a high green strength oil extended rubber comprising an ethylene-propylene-ethylidene norbornene terpolymer, containing approximately 70% ethylene and 3.5% ethylidene norbornene, having a Mooney viscosity of 35-45, extended with 40 parts/100 of parafinic oil available from Uniroyal Corporation.) | 60 |
| DYNH (low density polyethylene (0.92 D) having a melt index of 2.0 available from Union Carbide Corporation) | 16 |
| DPD 6169 a copolymer of ethylene and ethyl acrylate (18%) having a melt index of 6 and a density of 0.93) | 24 |

-continued

| | Parts by weight |
|---|---|
| Agarite Resin D (an antioxidant comprising a polymer of trimethylidi-hydroquinoline available from the R.T. Vanderbilt Corporation) | 3.3 |
| Zinc Stearate | 2 |
| Triallyl Cyanurate | 1.5 |
| Black Iron Oxide ($Fe_3O_4$) | 300 |

The resultant material was granulated and extruded in the form of tubing having an internal diameter of 1.14 cm on a wall thickness of 0.23 cm.

The tubing was then cross-linked by irradiating it with γ-rays from a $U^{235}$ Spent fuel Source (0.8 MeV Energy).

Certain physical properties of the resultant cross-linked tubing were measured and found to be as follows:

| | at 23° C. | at 150° C. |
|---|---|---|
| Tensile strength | 61 Kg/cm$^2$ | 14 Kg/cm$^3$ |
| Elongation at break | 213% | 404% |
| 100% modulus ($H_{100}$) | — | 6 Kg/cm$^2$ |

The tubing was then expanded, at 150° C., in a standard Raychem expander to an internal diameter of 2.54 cm.

Its electrical properties were measured as described in FIG. 26 of the accompanying drawings which show a sectional side elevation of one end of a 11.6/20 kilovolt cable which has been prepared for termination.

Referring to FIG. 26 of the drawings, a 11.6/kilovolt polyethylene cable designated generally by reference numeral 1 comprises a central conductor 2 surrounded by a conducting polyethylene stress control layer 3, the layer 3 being surrounded by an insulating layer 4. The bulk portion of the cable 1 also comprises a carbon paper layer 5, a copper screen 6 and an outer insulating sheath 7. The terminated portion of the cable 1 comprises the central conductor 2, the conducting polyethylene stress control layer 3, the insulating layer 4 and a short length of the carbon paper layer 5 and copper screen 6 extending from the bulk portion of the cable. The end of the cable 1 is provided with a cable lug 8 attached to the control conductor 2.

An 8 cm length of the expanded tubing was shrank on to the terminated portion of the cable 1 with an overlap of about 2 cm on to the extended portion of the copper screen 6, to provide a stress control covering 9. The heat-shrinkable tubing was also shrunk on to whipping 10 and an earth tail 11 within the region of overlap on to the copper screen 6. No attempt was made to fill the air gap between the covering 9 and the extended portion of the copper screen 6.

The discharge magnitude of a 2 cm length of the above 11.6/20 kilovolt cable, each end of which had been terminated as described above was determined using the apparatus and circuit shown in FIG. 27 of the accompanying drawings.

Referring to FIG. 27 of the drawings an earthed wire screen cage 12 contains a discharge-free step-up transformer 13, the secondary windings of which are connected to the central conductor 2 and the screen 6 respectively of the cable 1, through earth, via a parallel-connected voltage dropper 14 and blocking capacitor 15. The primary windings of the transformer 13 are connected to an AC input via a control and filter unit 16. Discharge levels in the cable and end terminations were measured using an FRA Mark III discharge detector 17 connected as shown. The results were as follows:

| Discharge Magnitude (pC) | Applied Voltage (KV r.m.s.) |
|---|---|
| 1 | 33 KV |
| 5 | 41 KV |

For comparison the same cable, in the absence of the shrunk tubing at the terminations, was tested in the same manner. Discharge of 5pC at an applied voltage of 4.8 KV r.m.s. were obtained.

It may thus be seen that the tubing of the material of the invention gave excellent stress control and that the cable was discharge free at the normal working voltage (11.6 KV r.m.s. phase to ground).

The resistance characteristics of the material were measured in the following manner:

A plaque measuring 15.3 cm × 15.3 cm × 0.1 cm of the material was placed between two brass electrodes manufactured to the dimensions given in BS 2782 pt. 201C, 1970, page 110.

The current flowing between the brass electrodes was measured as a function of D.C. voltage between 100 V and 10 KV, using the circuit shown in FIG. 1 of the accompanying drawings.

The current I and voltage V were found to be related by the equation.

$$I = KV^\gamma$$

where
I is current
V is applied voltage
K is a constant, and
for a linear material i.e. on which obeys Ohm's Law,
$\gamma = 1$.

For the material of this example γ was found to be 3.0. At a voltage stress of 1KV/mm the plaque passed a current of 96 μA.

EXAMPLE 2

The following substances were mixed together, at about 110° C. in a twin roll laboratory mill:

| | Parts by weight |
|---|---|
| Royalene 611 | 60 |
| LYNH | 16 |
| DPD 6169 | 24 |
| Agerite Resin D | 3.3 |
| Zinc Stearate | 2 |
| Cobalt Oxide ($Co_3O_4$) | 300 |
| Triallyl Cyanurate | 1.3 |
| αα'-bis (t-butylperoxy) m-p di-isopropyl benzene | 5 |

A plaque 1 mm thick was moulded from the resultant material at 190° C. for 10 mins. and its resistance characteristics were determined as described in Example 1. The value of $\gamma$ was 2.85 and the current passed by the plaque at a stress of 1 KV/mm was 285 $\mu$A.

Raychem Parts No. RUK 453-3 (tubes of 100 mm length, 3 mm wall thickness, unexpanded internal diameter 20 mm, expanded diameter 40 mm) were moulded from the material and the stress-grading properties of the material were tested by the method described in Example 1 using a terminated 2 meter length of 5.8/10 KV cable having such a part shrunk on to each termination. The discharge levels obtained were:

| Discharge Magnitude pC | Applied Voltage KV/r.m.s. |
| --- | --- |
| 1 | 20 |
| 5 | 25 |

The discharge magnitude for the cable in the absence of stress grading means was 5pC at 4.8 KV.

It can thus be seen that this material has good stress grading properties.

EXAMPLE 3

The following substances were mixed together at about 110° C. in a twin roll laboratory mill:

|  | Parts by weight |
| --- | --- |
| Royalene 301T (a copolymer of 68% by weight ethylene and 32% by weight propylene having a medium cure rate and a Mooney viscosity of 60 available from Uniroyal Corporation) | 60 |
| DPD 6169 | 16 |
| DYNH | 24 |
| Strontium Titanate | 367 |
| Agerite Resin D | 4 |
| Triallyl Cyanurate | 2 |
| 2,5 dimethyl-1,5 di-t-butyl peroxyhexyne-3 | 4 |

A plaque 1 mm thick was moulded from the resultant material and the resistance characteristics were determined by the method described in Example 1.

$\gamma$ was found to be 2.55 and the current passed by the plaque at a stress of 1 KV/mm was 0.3 $\mu$A.

EXAMPLE 4

The following substances were mixed together at about 110° C. in a twin roll mill.

|  | Parts by weight |
| --- | --- |
| DPD 6169 | 100 |
| Barium Stannate | 700 |
| Agerite Resin D | 4 |
| Triallyl Cyanurate | 2 |
| 2,5 dimethyl-2,5 di-t-butyl peroxyhexyne-3 | 4 |

A plaque 1 mm. thick was moulded from the resultant material at 190° C. and its resistance characteristics were determined as described in Example 1.

$\gamma$ was found to be 2.23 and the current passed by the plaque at a stress of 1 KV/mm was 0.075 $\mu$A.

EXAMPLE 5

The following substances were mixed together at about 110° C. in a twin roll mill.

|  | Parts by weight |
| --- | --- |
| Royalene 301T | 60 |
| DPD 6169 | 16 |
| DYNH | 24 |
| Barium Titanate | 376 |
| Vulcan XXX Special (an oil furnace black having a surface area of 140 m$^2$/g and a particle diameter of 20.25 mu) | 10 |
| Agerite Resin D | 4 |
| Triallyl Cyanurate | 2 |
| Dicumyl Peroxide (40%) | 4 |

A plaque 1 mm. thick was moulded from the resultant material at 178° and its resistance characteristics were determined as described in Example 1.

$\gamma$ as found to be 1.80 and the current passed by the sample at a stress of 1 KV/mm was 0.8 $\mu$A.

For comparison a similar material without Vulcan XXX Special which is a conductive carbon black, give a $\gamma$ value of 3.40 and the current passed at a stereo of 1 KV/mm of 0.031 $\mu$A.

EXAMPLES 6–11

The following substances were mixed together in a twin roll laboratory mill.

| Example No. | 6 | 7 | 8 | 9 | 10 | 11 |
| --- | --- | --- | --- | --- | --- | --- |
| Royalene 611 | 60 | 60 | 60 | 60 | 60 | 60 |
| DYNH | 16 | 16 | 16 | 16 | 16 | 16 |
| DPD 6169 | 24 | 24 | 24 | 24 | 24 | 24 |
| Agerite Resin D | 4 | 4 | 4 | 4 | 4 | 4 |
| Zinc Stearate | 2 | 2 | 2 | 2 | 2 | 2 |
| Triallyl cyanurate | 1.5 | 1.5 | 1.5 | 1.5 | 1.5 | 1.5 |
| MoS$_2$ | 300 | 200 | — | — | — | — |
| MoTe$_2$ | — | — | 300 | 200 | — | — |
| MoSe$_2$ | — | — | — | — | 300 | 200 |

Each material was then pressed at 130° C. into a plaque 150×150×1 mm., and the resistance characteristics were determined as described in Example 1.

Figure 2:
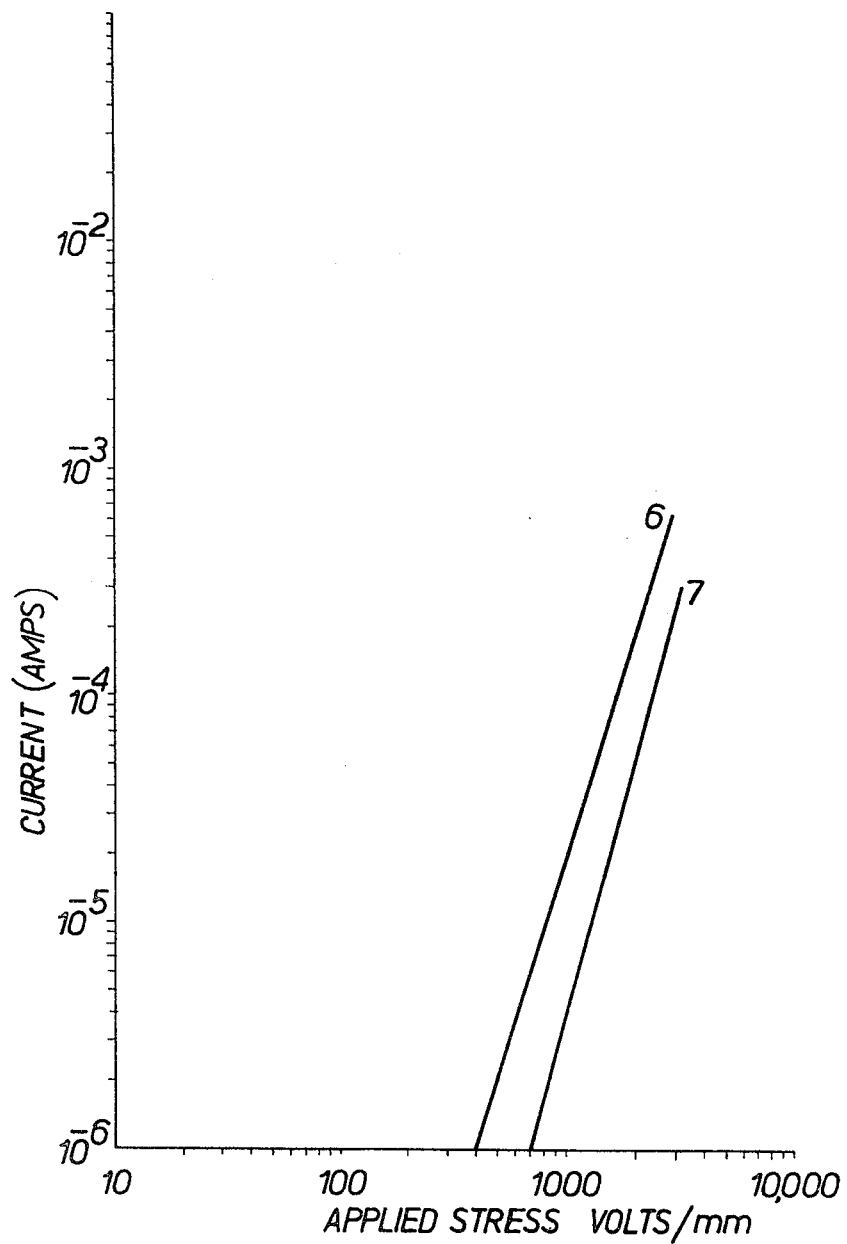
Figure 3:
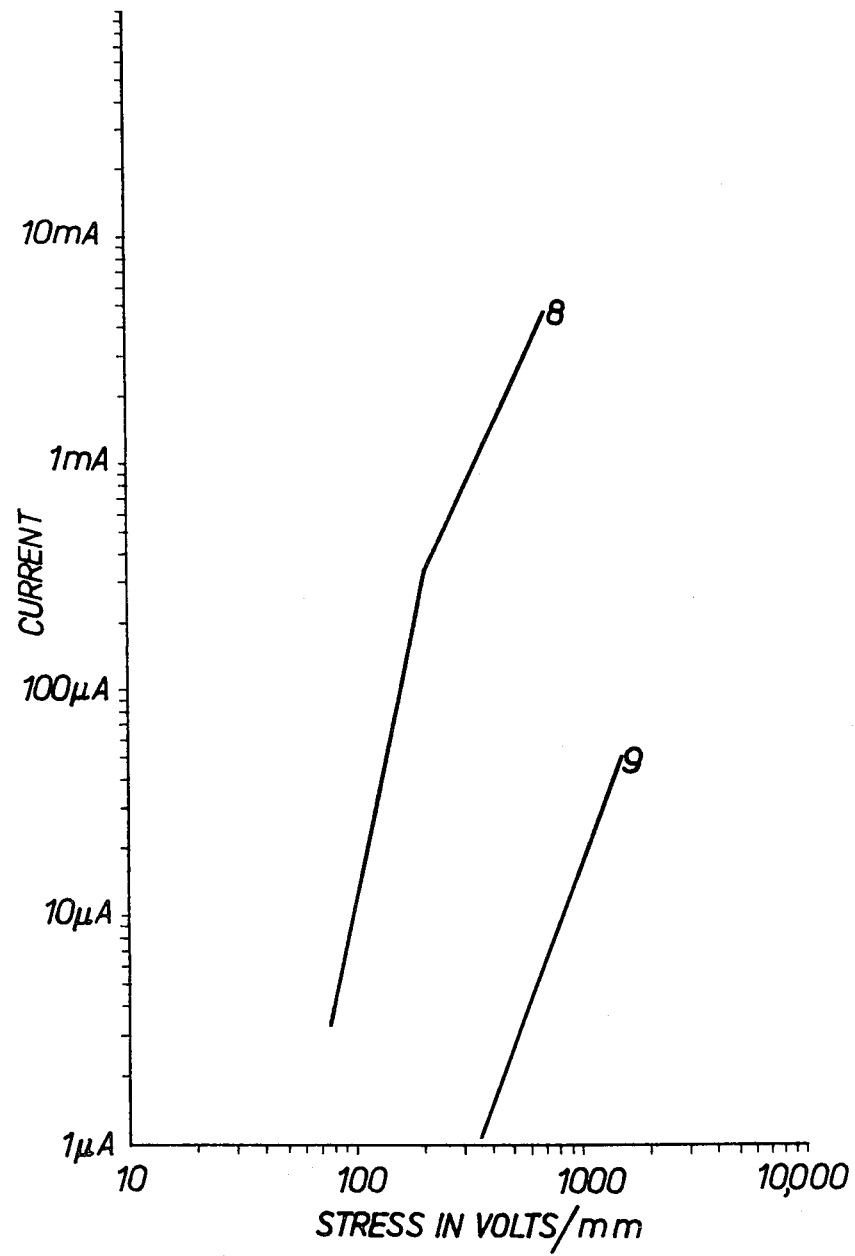
Figure 4:
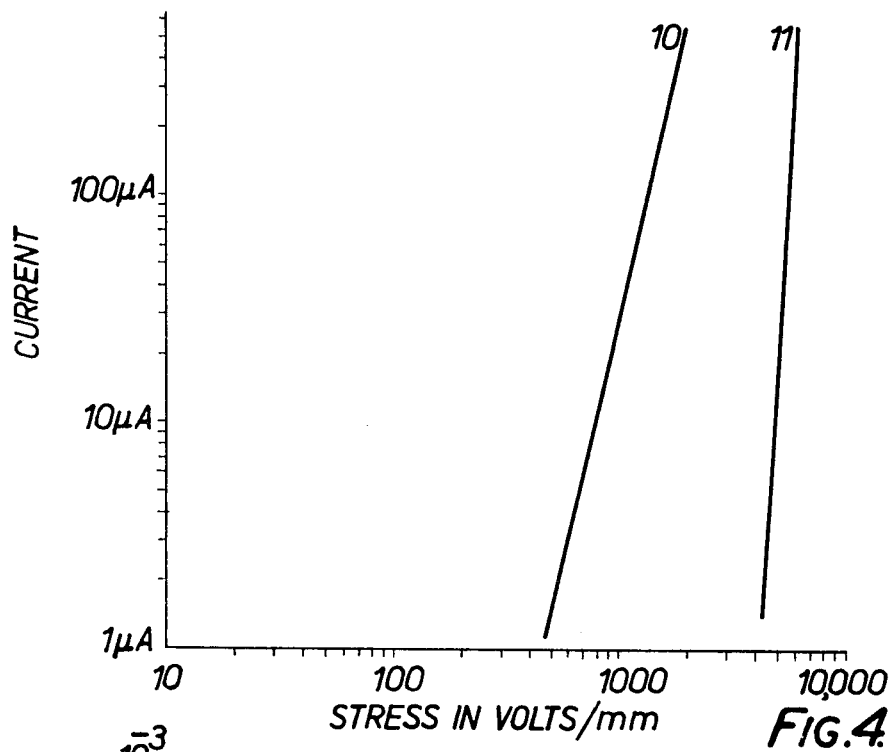
Figure 5:
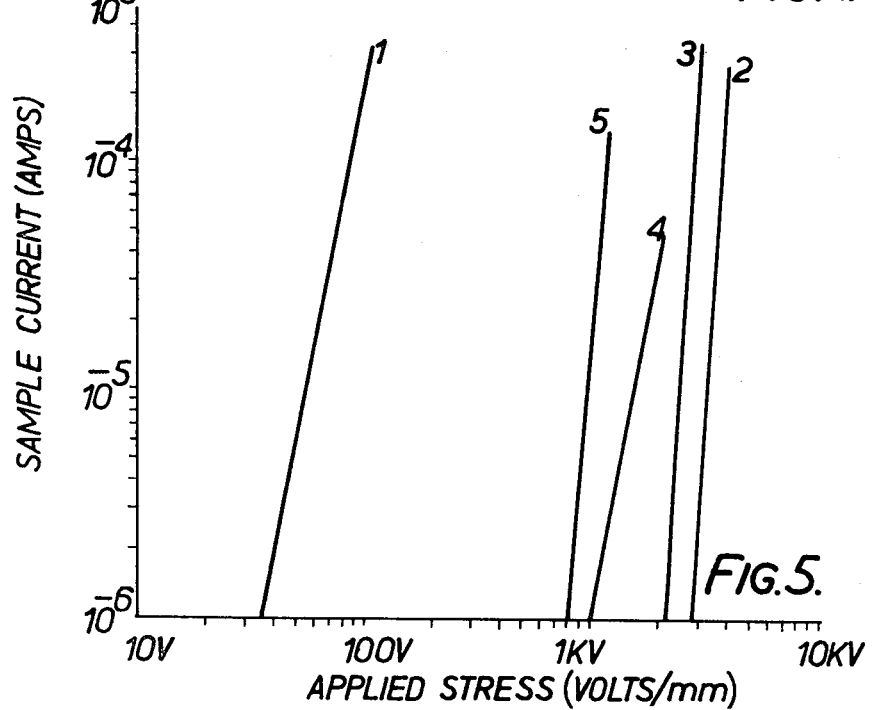
Figure 6:
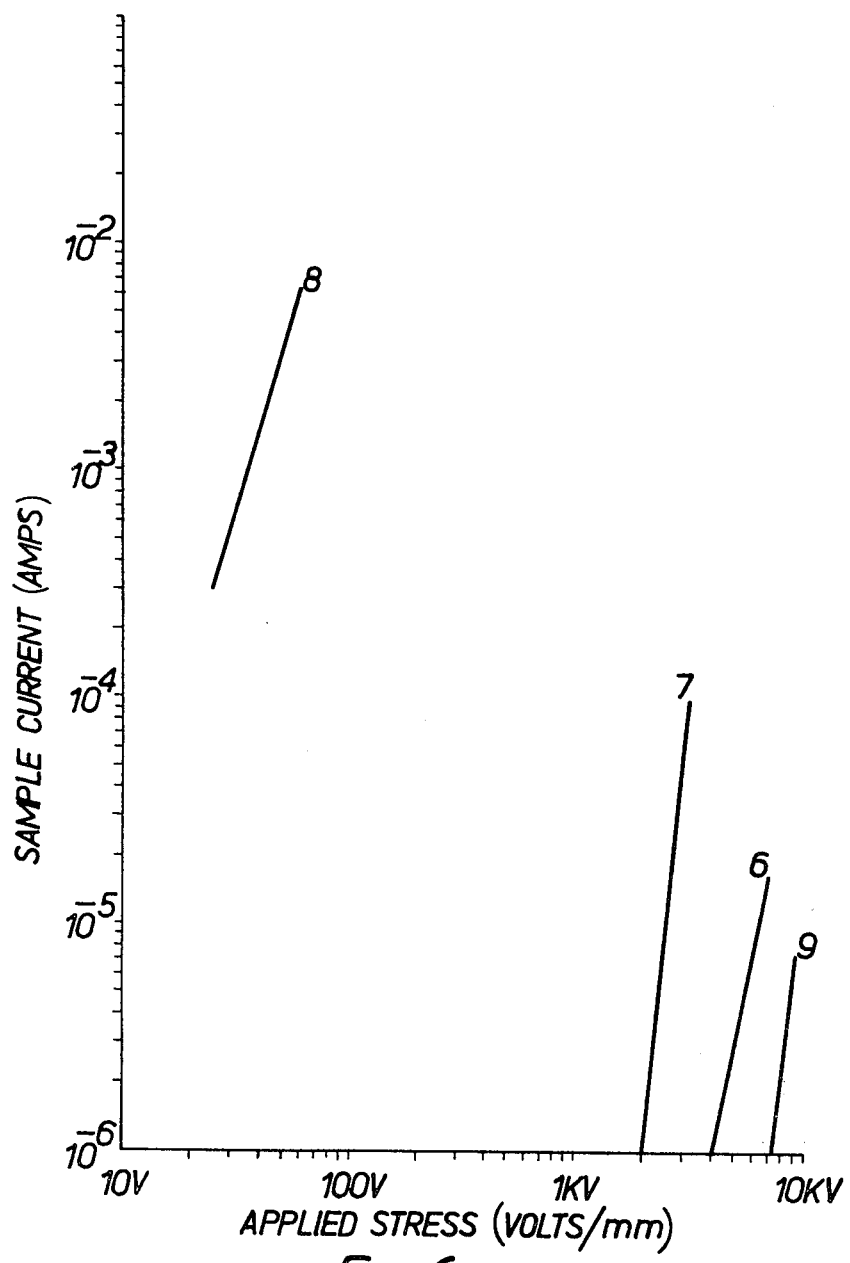
Figure 7:
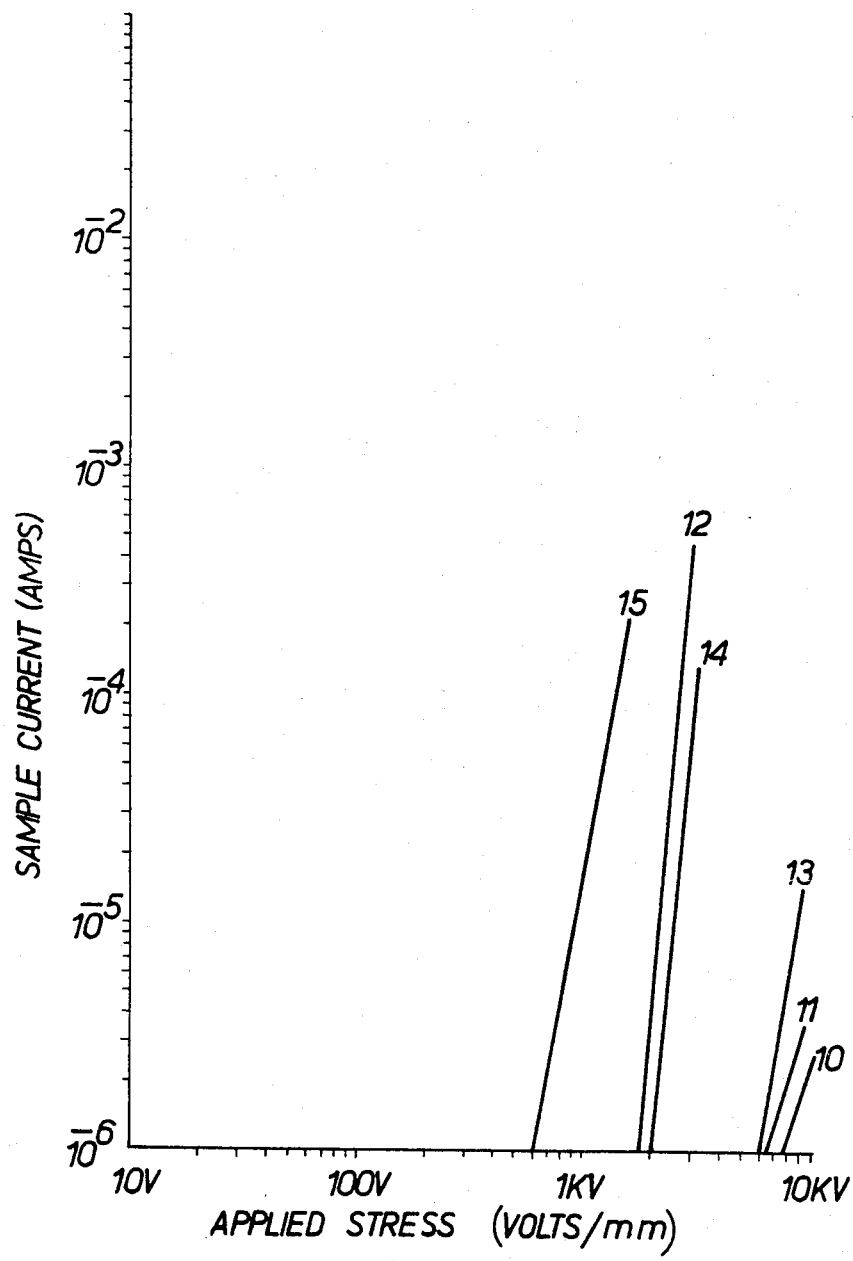
Figure 8:
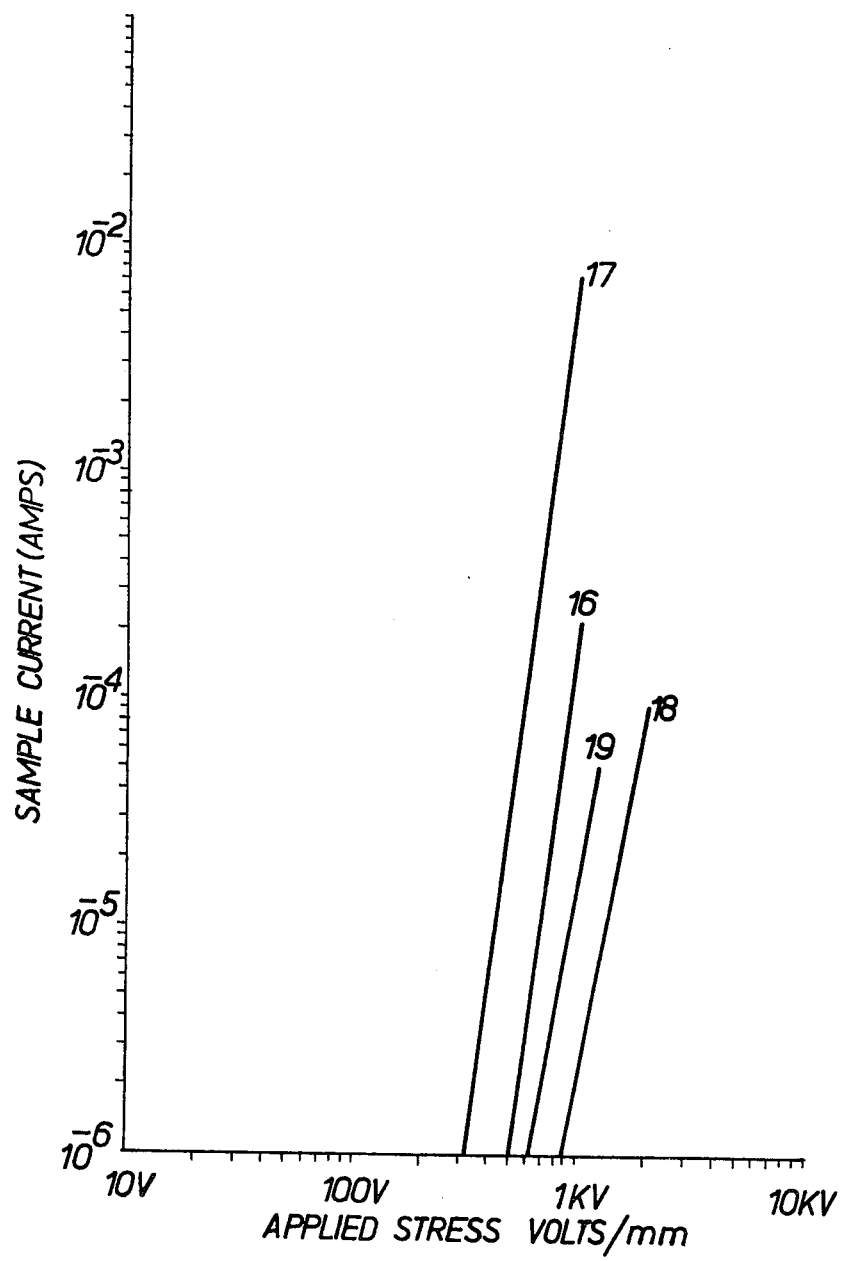
Figure 9:
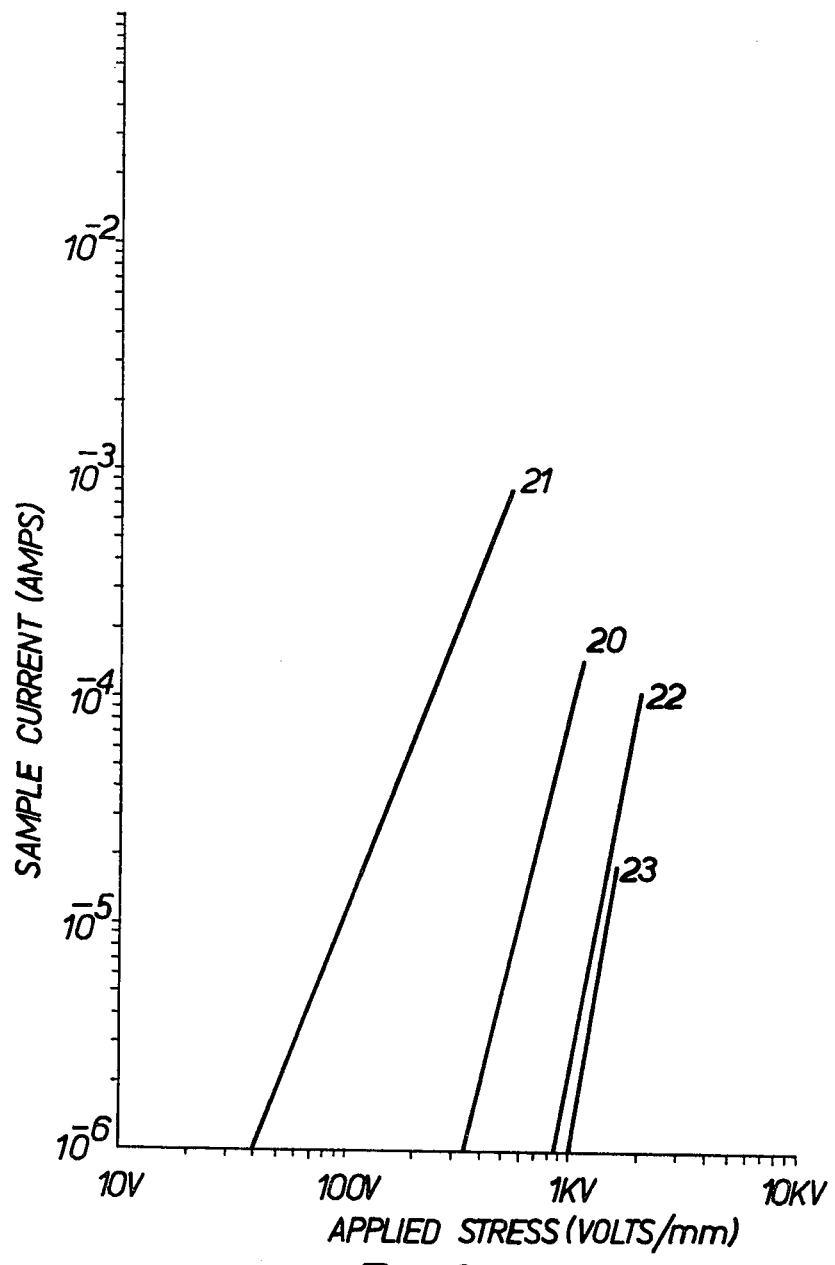
Figure 10:
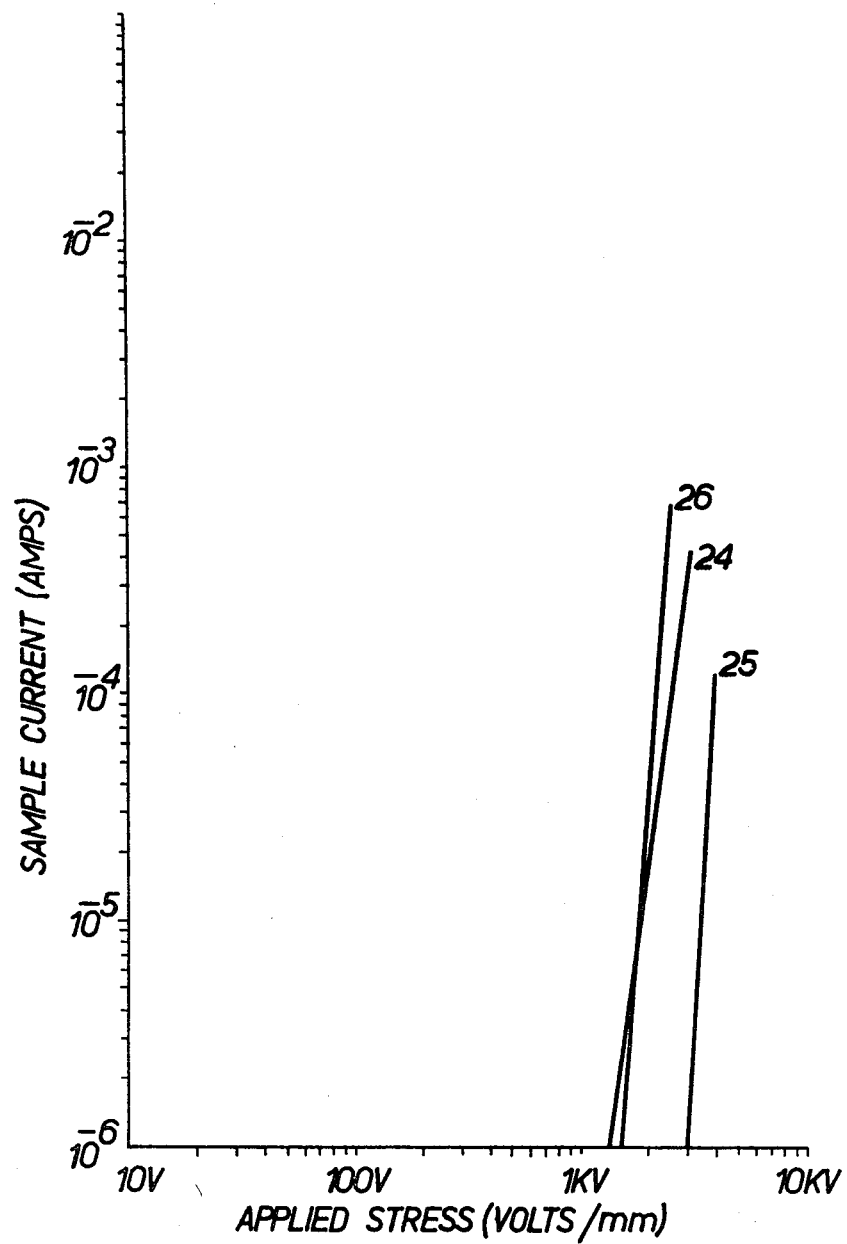
Figure 11:
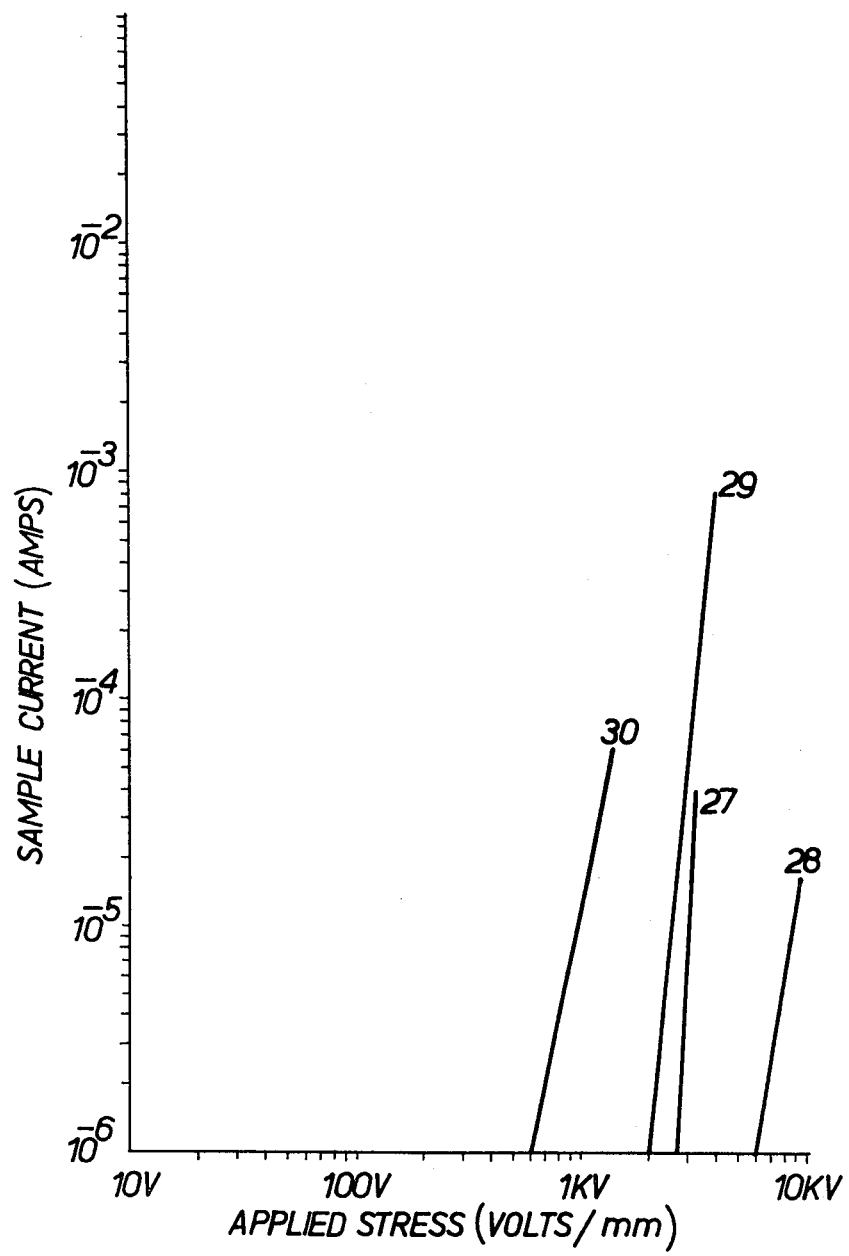
Figure 12:
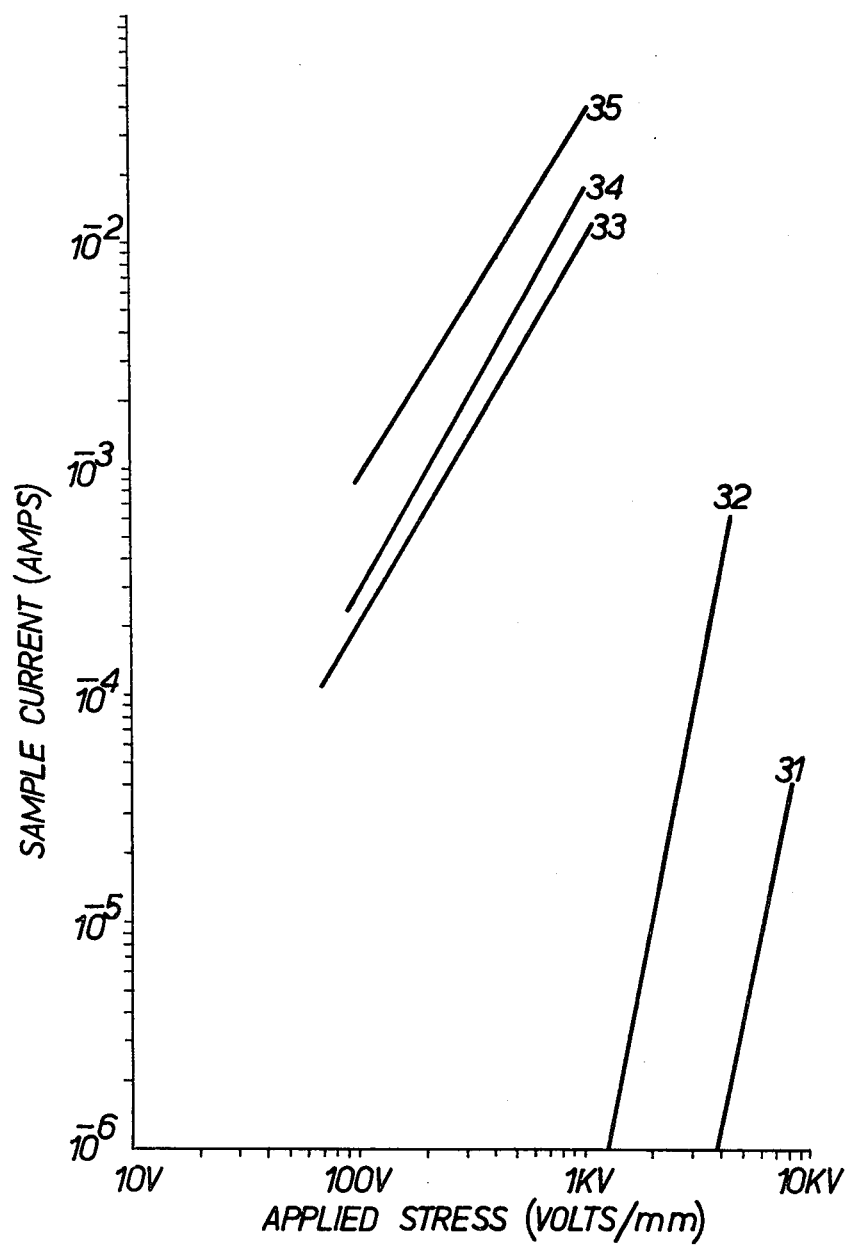
Figure 13:
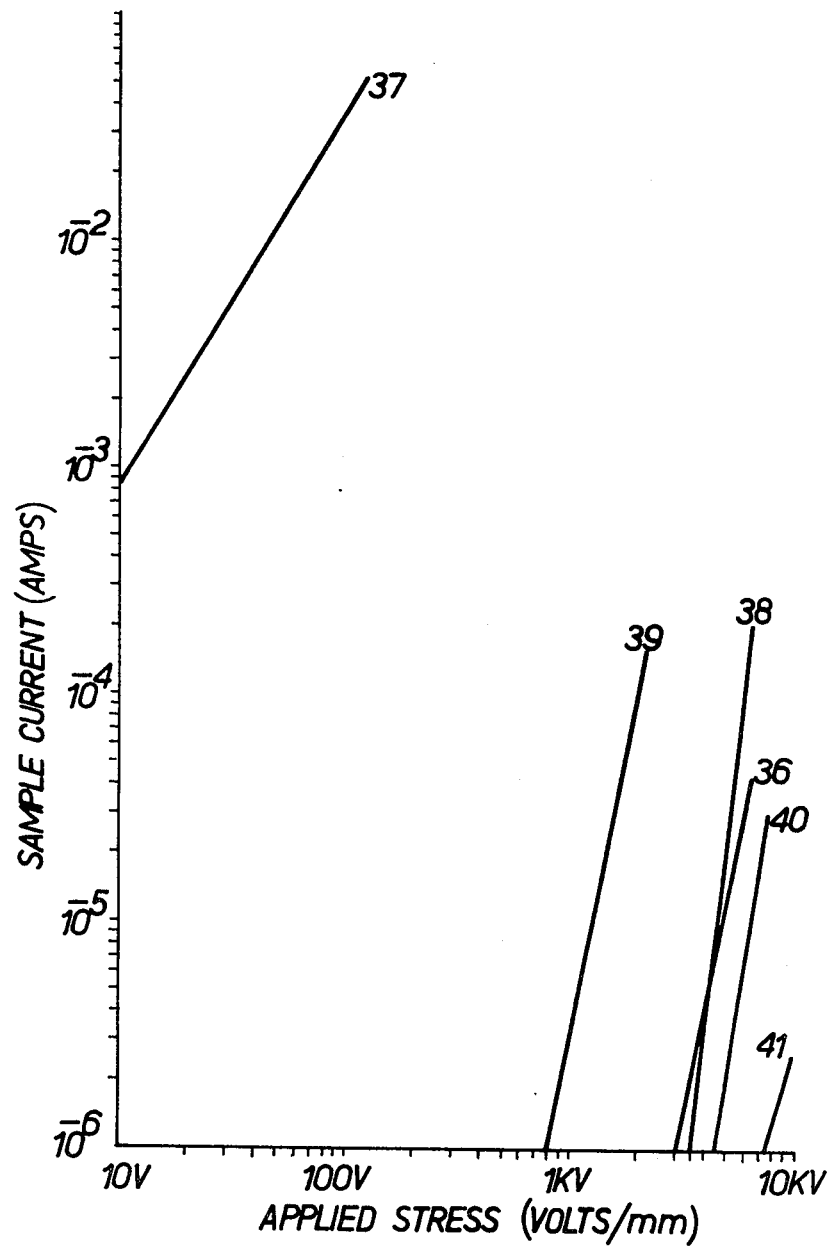
Figure 14:
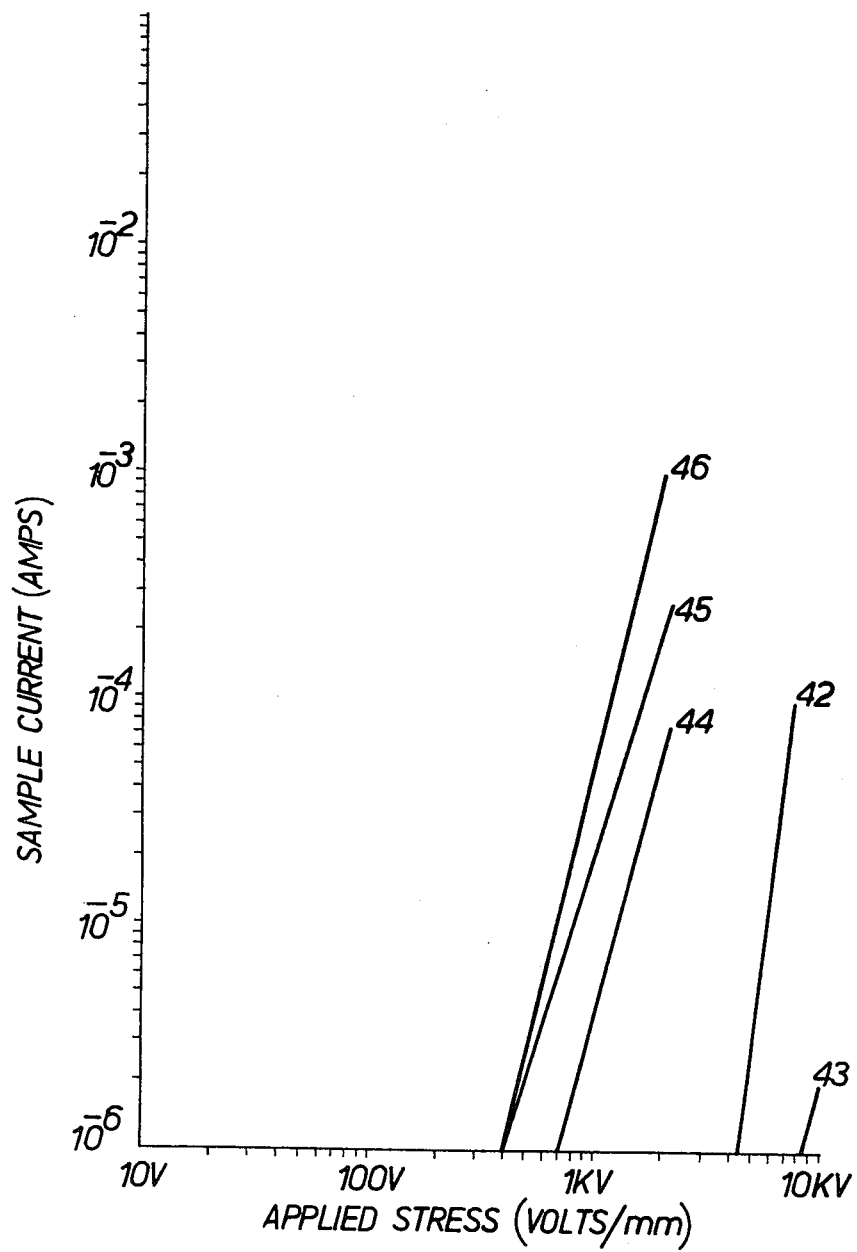
Figure 15:
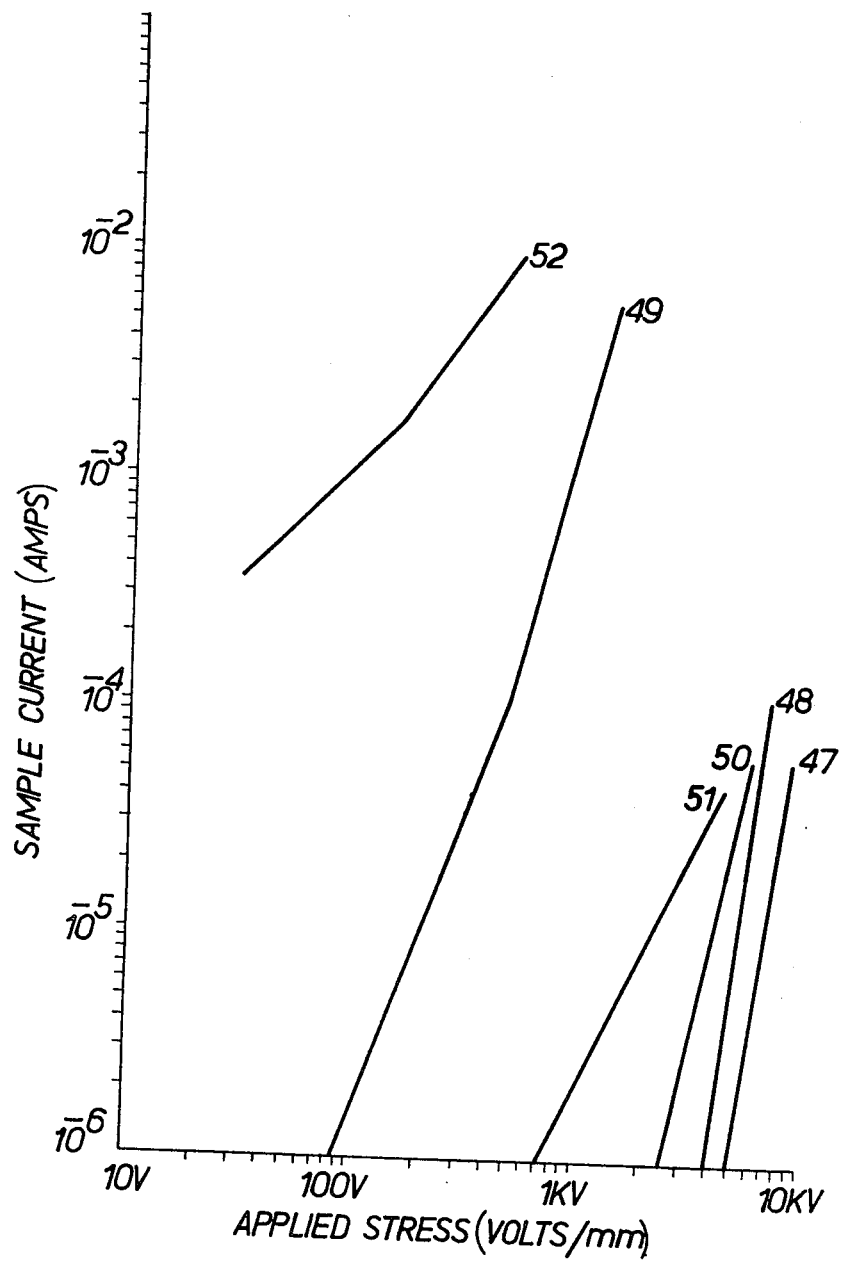
Figure 16:
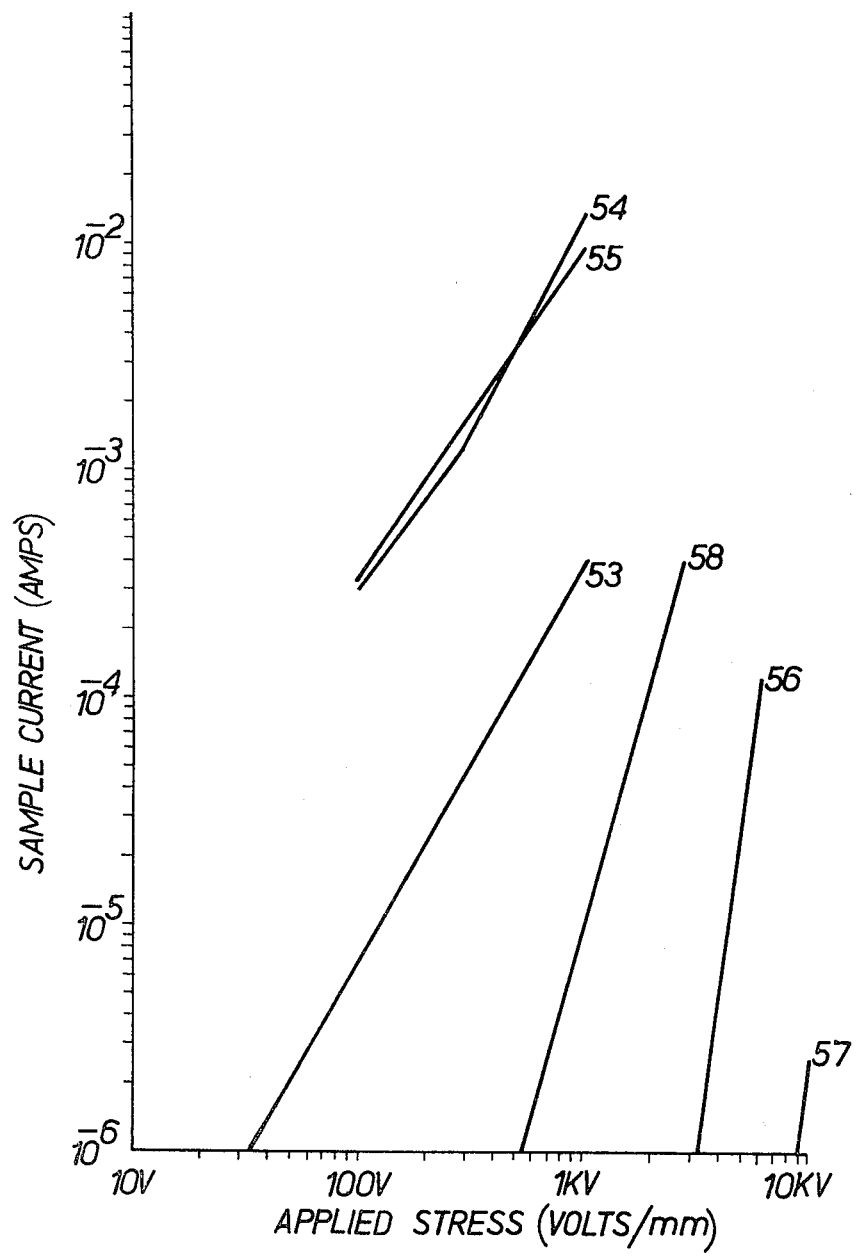
Figure 17:
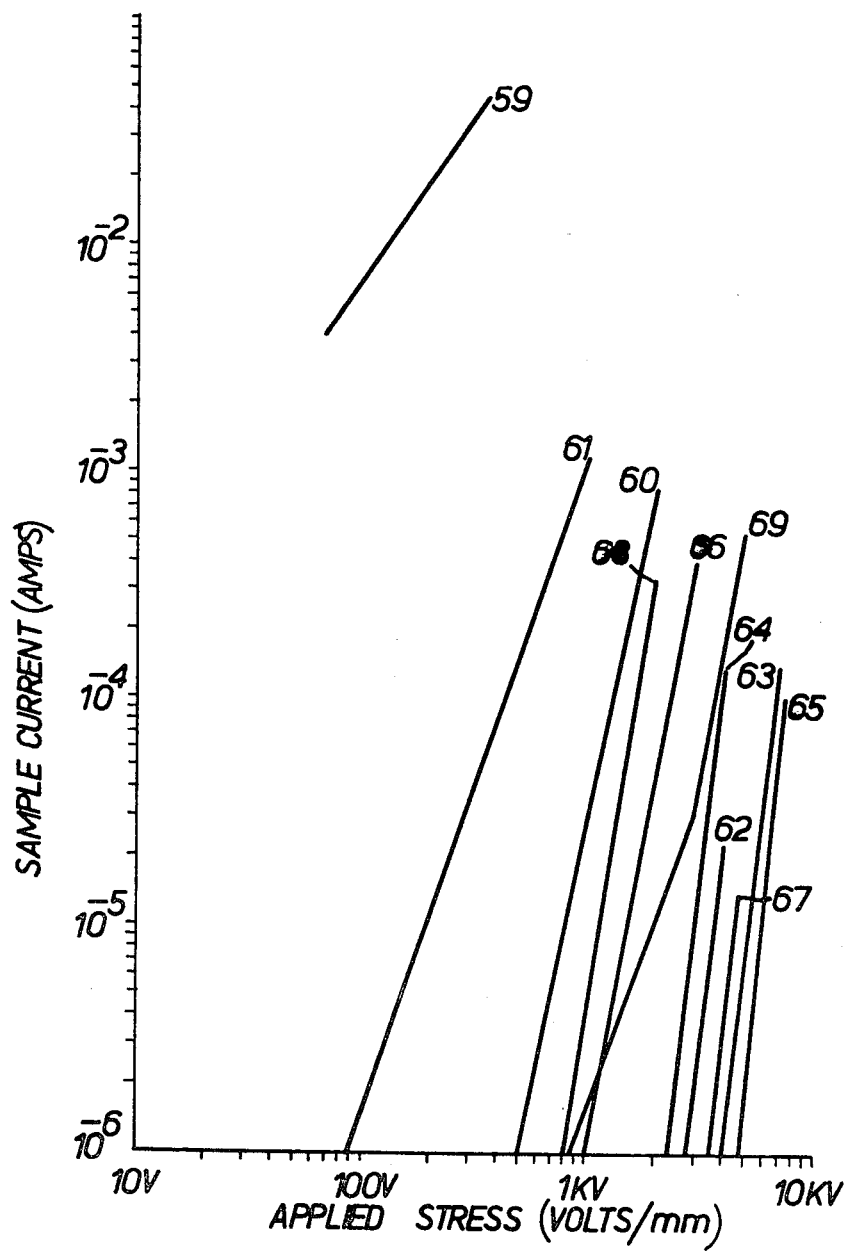
Figure 18:
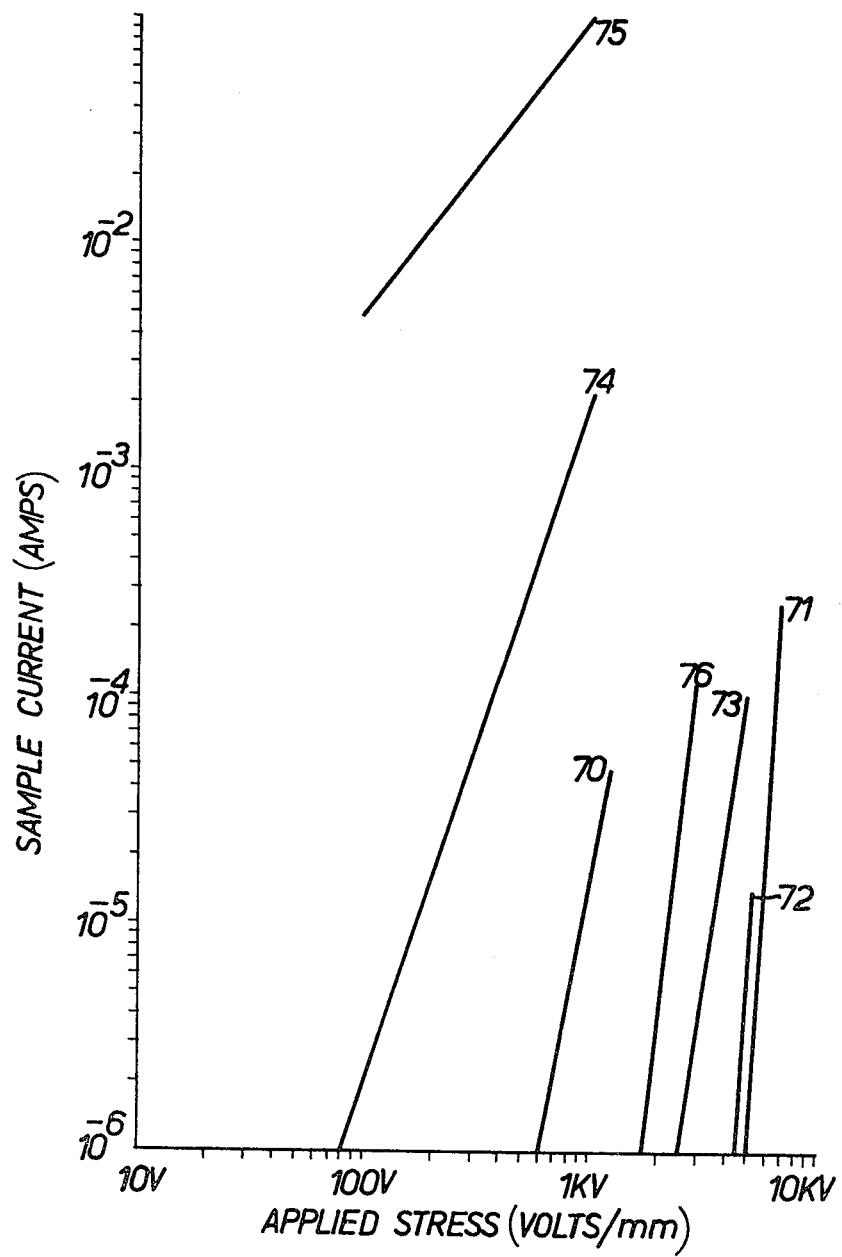
Figure 19:
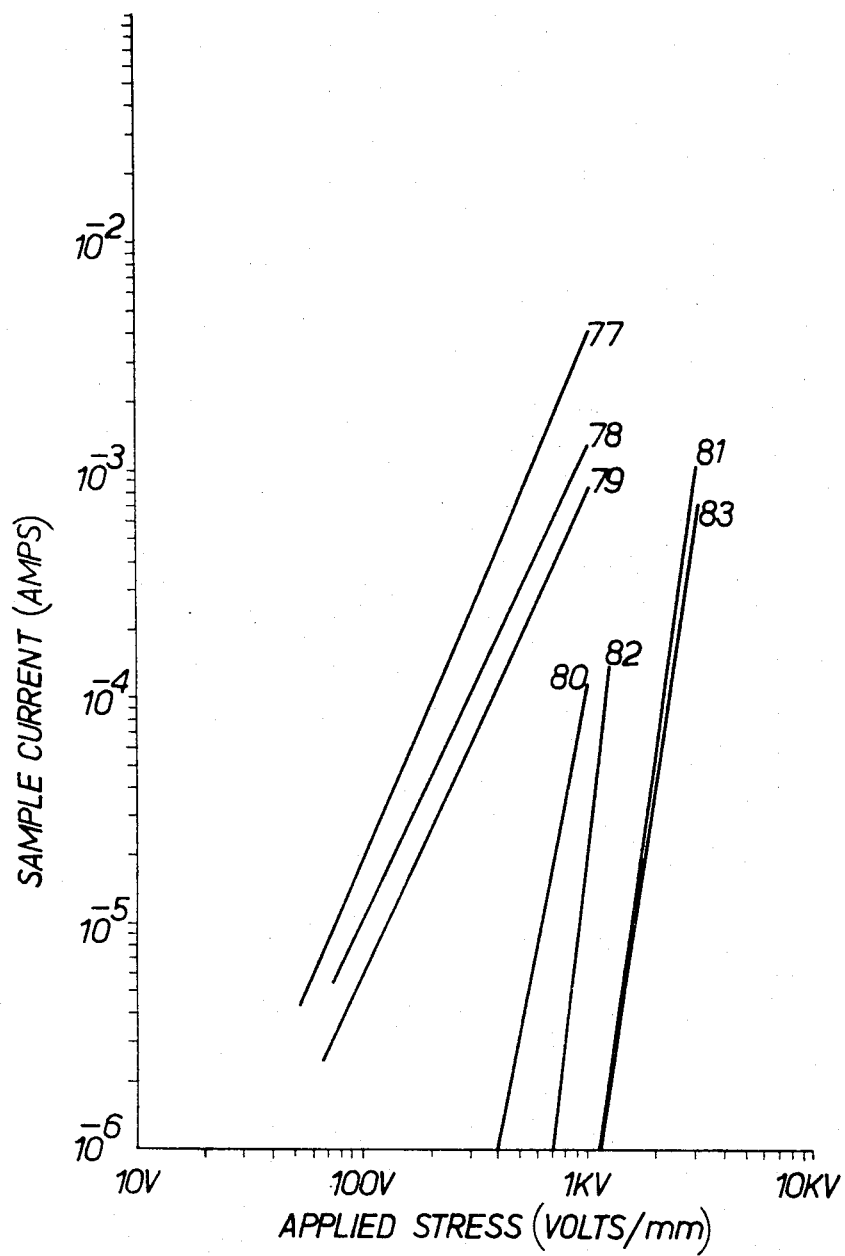
Figure 20:
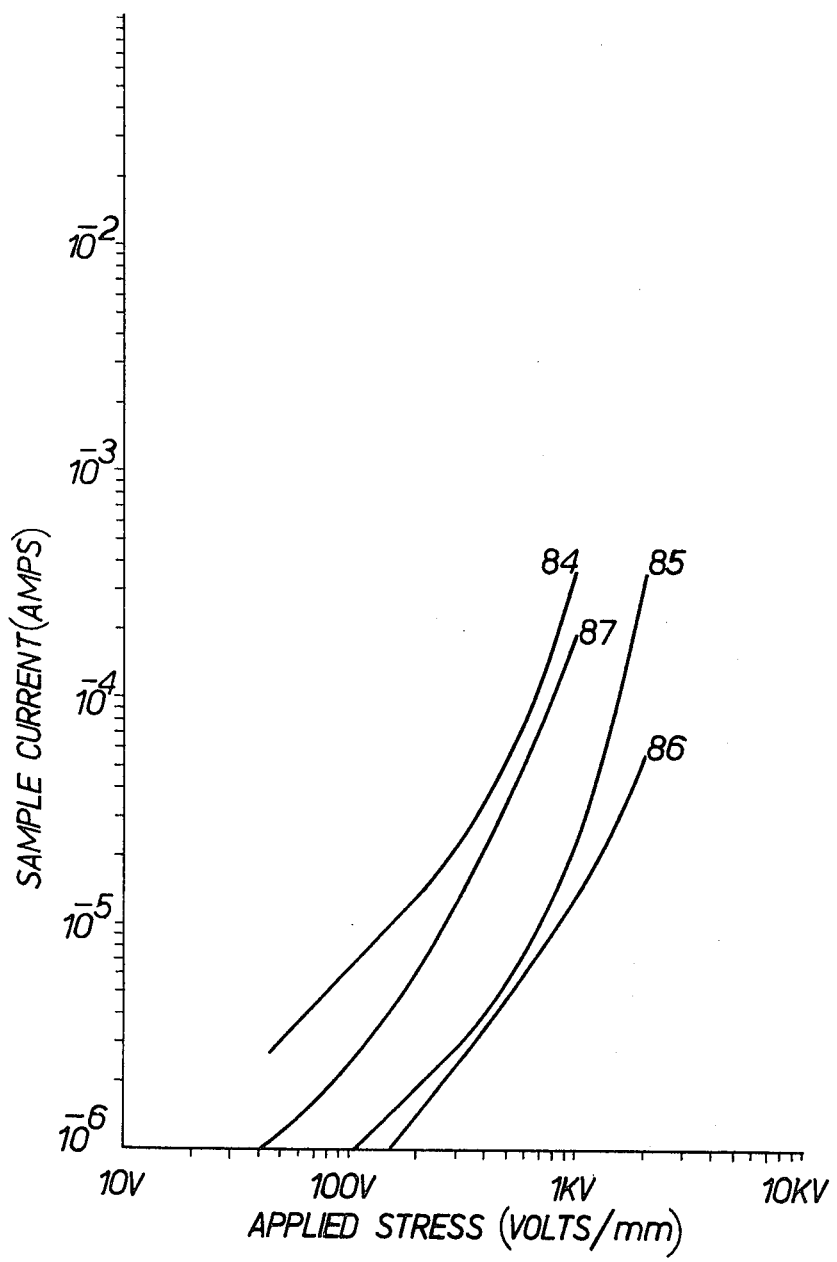
Figure 21:
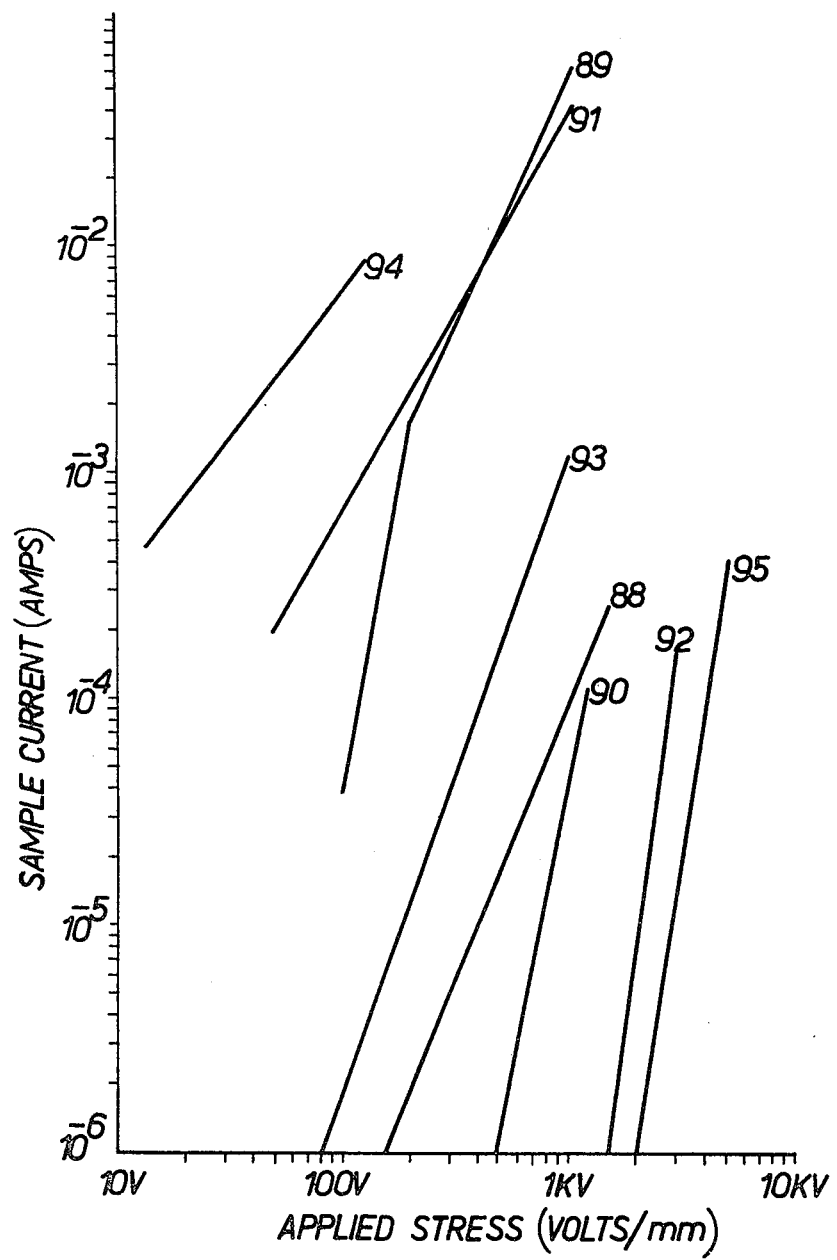
Figure 22:
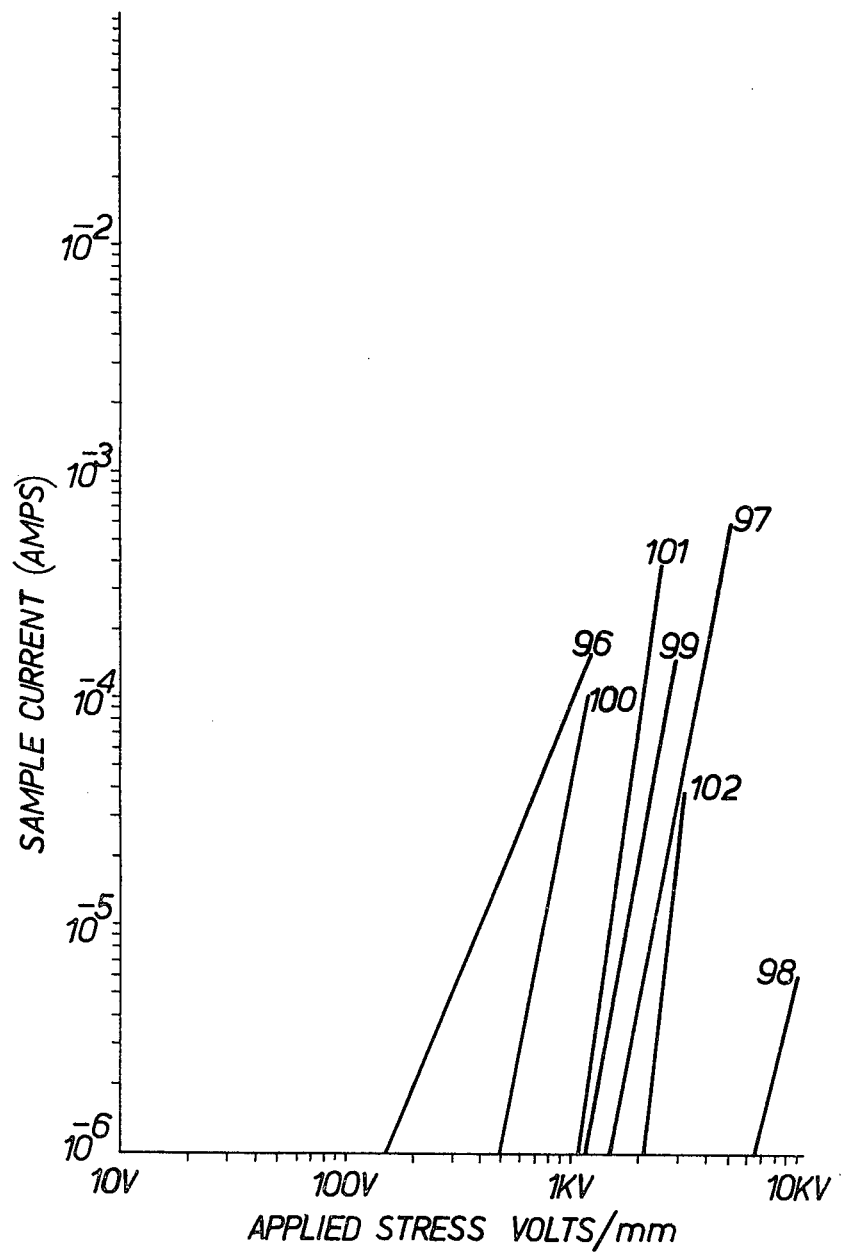
Figure 23:
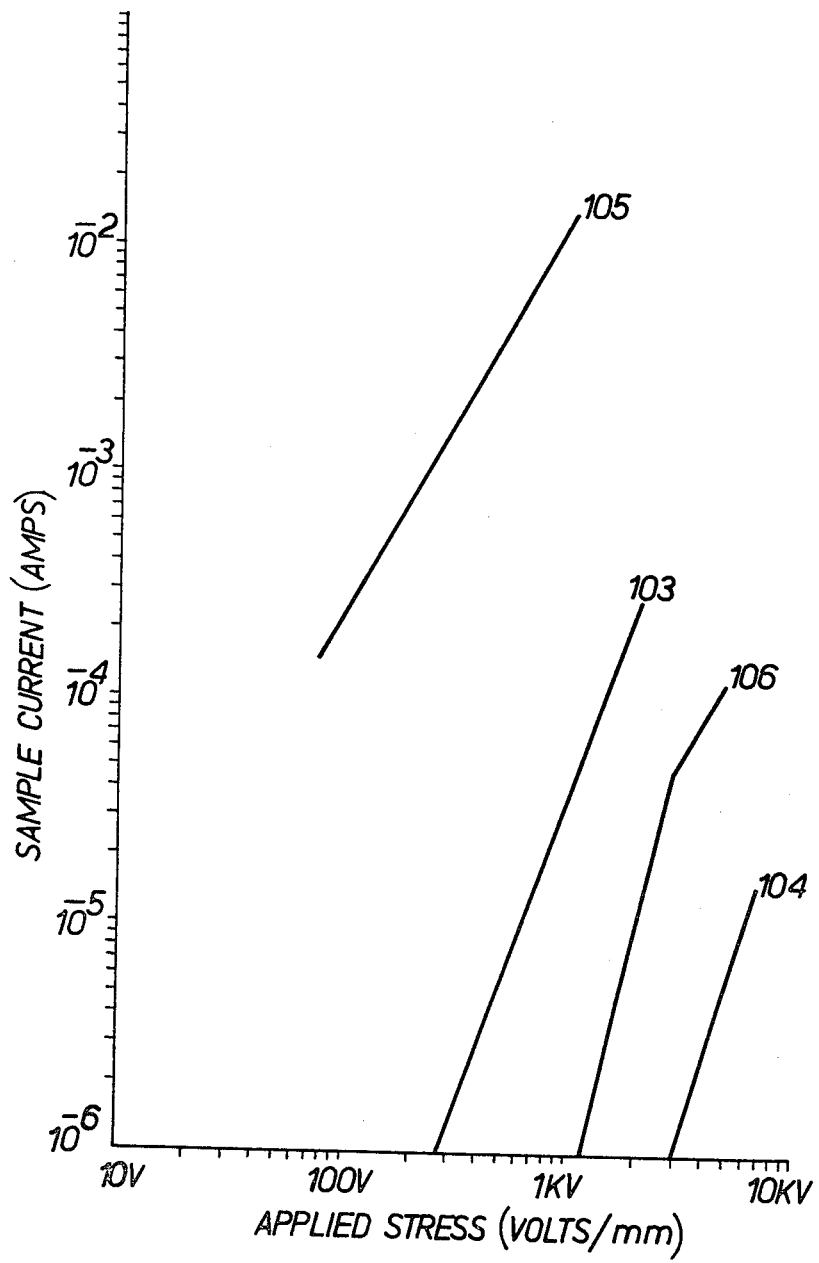
Figure 24:
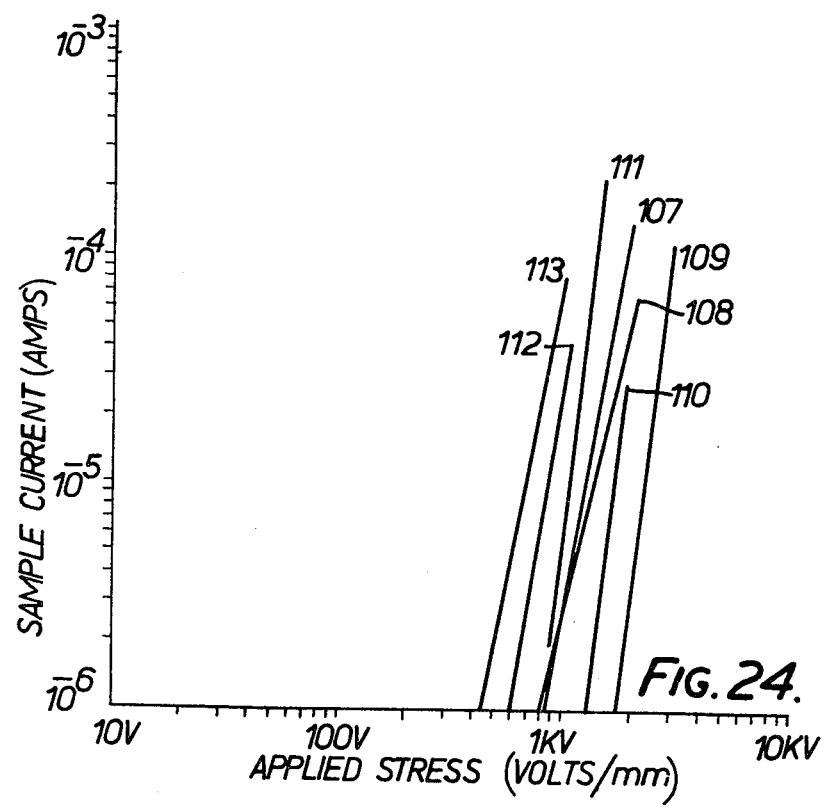
Figure 25:
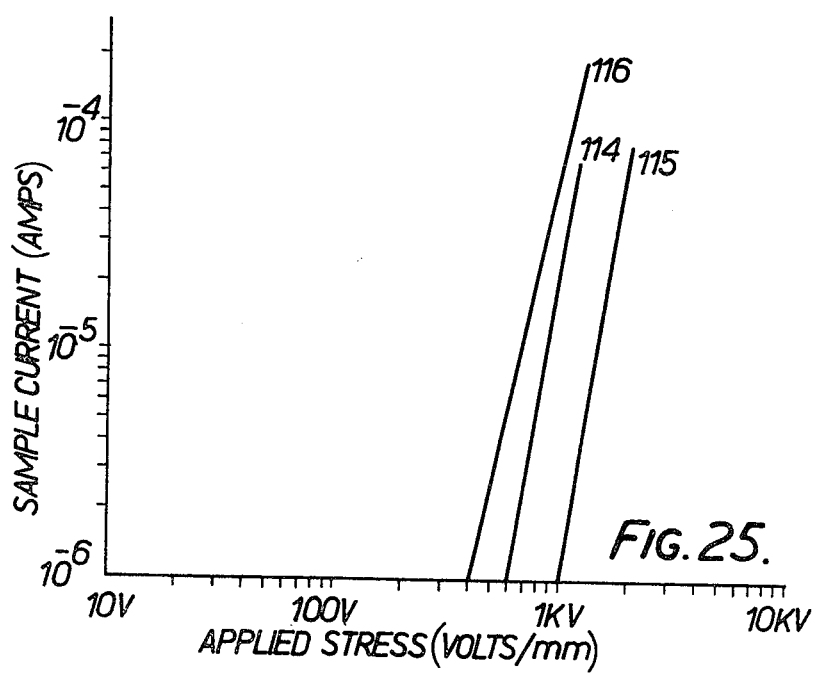

Graphs of log I vs. log V for the plaques of these Examples are shown in FIGS. 2 to 4 of the accompanying drawings.

The values of $\gamma$ were determined to be as follows:

| Example No. | $\gamma$ |
| --- | --- |
| 6 | 3.3 |
| 7 | 3.8 |
| 8 | (low stress) $\gamma_1$ = 5.0 (see graph) |
|  | (high stress) $\gamma_2$ = 2.0 |
| 9 | 2.6 |
| 10 | 4.5 |
| 11 | 10 |

Graphs of current vs. voltage for Examples 6 and 7 are shown also in graphs 45 and 44 respectively of the accompanying drawings.

In the remaining Examples the following base polymer was used unless stated otherwise.

EXAMPLES 12 TO 45

Mixtures of Spinels and Conductive Metallic Particles

| | Parts by weight |
|---|---|
| Royalene 611 | 60 |
| DYNH | 16 |
| DPD 6169 | 24 |
| Agerite Resin D | 4 |
| Zinc Stearate | 4 |
| Triallyl cyanurate | 1.5 |

200 parts by weight of $Fe_3O_4$ supplied by Pfizers Limited under the trade name BK 5099 or 200 parts by weight of $Co_3O_4$ supplied by Hopkins and Williams were added to the base polymer. Additional metal fillers were added to the amounts shown in Tables 1 and 11 which follow. The ingredients were processed as described in the earlier Examples and slabs 150×150×1 mm were prepared as previously described. The current-voltage characteristics were determined as described previously.

The $\gamma$ values were obtained are given in Tables 1 and 11 and the current-voltage graphs are shown in graphs 1–30 of the accompanying drawings.

TABLE 1

$Fe_3O_4$

| Example No. | Metal and loading | $\gamma$ | Graph No. |
|---|---|---|---|
| 12 | 50 pts Al | 5 | 1 |
| 13 | 100 pts Al | Sample punctured at 40 volts | — |
| 14 | 50 pts Cu | 14.3 | 2 |
| 15 | 100 pts Cu | 16.4 | 3 |
| 16 | 50 pts Fe | 5.1 | 4 |
| 17 | 100 pts Fe | 10.4 | 5 |
| 18 | 50 pts Mn | 4.4 | 6 |
| 19 | 100 pts Mn | 9.6 | 7 |
| 20 | 100 pts Cr | 3.5 | 8 |
| 21 | 100 pts Pb | 8.75 | 9 |
| 22 | 50 pts Ni | 2.6 | 10 |
| 23 | 100 pts Ni | 2.9 | 11 |
| 24 | 50 pts Ni/Al | 12 | 12 |
| 25 | 100 pts Ni/Al | Sample punctured at 50 volts | — |
| 26 | 50 pts Zn | 7.75 | 13 |
| 27 | 100 pts Zn | 8.8 | 14 |
| 28 | 50 pts Ag | 17 | 15 |
| 29 | 100 pts Ag | Sample punctured at 100 volts | — |

Where the sample is indicated to have punctured, this means that, at the stated stress, the sample was so conductive that it shorted out. The Ni/Al in Examples 41 and 42 was based on Raney Nickel powder.

TABLE II $Co_3O_4$

| Example No. | Metal and loading | $\gamma$ | Graph No. |
|---|---|---|---|
| 30 | 50 pts Al | 7 | 16 |
| 31 | 100 pts Al | 8 | 17 |
| 32 | 50 pts Cu | 5.6 | 18 |
| 33 | 100 pts Cu | 5.8 | 19 |
| 34 | 50 pts Fe | 4.1 | 20 |
| 35 | 100 pts Fe | 3 | 21 |
| 36 | 50 pts Mn | 5.75 | 22 |
| 37 | 100 pts Mn | 6.3 | 23 |
| 38 | 100 pts Pb | 7.25 | 24 |
| 39 | 50 pts Ni | 16.6 | 25 |
| 40 | 100 pts Ni | 12.3 | 26 |
| 41 | 50 pts Ni/Al | 21 | 27 |
| 42 | 100 pts Ni/Al | Sample punctured | — |

TABLE II-continued $Co_3O_4$

| Example No. | Metal and loading | $\gamma$ | Graph No. |
|---|---|---|---|
| | | at 2KV | |
| 43 | 50 pts Zn | 3.8 | 28 |
| 44 | 100 pts Zn | 10 | 29 |
| 45 | pts Ag | 5 | 30 |

These results show that all the compositions exhibited nonlinear behaviour.

EXAMPLES 46 TO 52

Mixtures containing Carbon Blacks

Various amounts of Vulcan XXX Special, a conductive black made by Cabot Carbons, were blended with $Fe_3O_4$ (BK 5099) and Silicon Nitride (supplied by Advanced Materials Engineering Limited). The voltage current characteristics were measured as before and the results are shown in Table III and in graphs 31 to 37 of the accompanying drawings. In Table III and the following tables "phr" means parts, by weight, per hundred parts of polymer base.

TABLE III

| Example No. | Fillers and Loading | | $\gamma$ | Graph No. |
|---|---|---|---|---|
| 46 | 33 phr $Fe_3O_4$ 13.3 | phr XXX Sp. | 5.03 | 31 |
| 47 | 100 phr $Fe_3O_4$ 13.3 | phr XXX Sp. | 5.08 | 32 |
| 48 | 300 phr $Fe_3O_4$ 13.3 | phr XXX Sp. | 1.7 | 33 |
| 49 | 300 phr $Fe_3O_4$ 16.7 | phr XXX Sp. | 1.55 | 34 |
| 50 | 300 phr $Fe_3O_4$ 20.0 | phr XXX Sp. | 1.64 | 35 |
| 51 | 200 phr $Si_3N_4$ 20 | phr XXX Sp. | 4 | 36 |
| 52 | 200 phr $Si_3N_4$ 30 | phr XXX Sp. | 1.42 | 37 |

These results show that the mixtures behaved in a non linear fashion.

EXAMPLES 53 TO 58

Mixtures of $Fe_3O_4$ and barium titanate

Various mixtures, as shown in Table IV, were added to the base polymer.

The voltage-current characteristics were determined as described earlier. The $\gamma$ values obtained are given in Table IV and voltage-current graphs are shown in graphs 38 to 43 of the accompanying drawings. These results show that the materials behave in a pronounced non-linear fashion.

TABLE IV $Fe_3O_4/BaTiO_3$

| Example No. | Fillers and Loading | | $\gamma$ | Graph No. |
|---|---|---|---|---|
| 53 | 200 phr $Fe_3O_4$ | 100 phr $BaTiO_3$ | 10 | 38 |
| 54 | 250 phr $Fe_3O_4$ | 50 phr $BaTiO_3$ | 5.1 | 39 |
| 55 | 150 phr $Fe_3O_4$ | 150 phr $BaTiO_3$ | 6.6 | 40 |
| 56 | 100 phr $Fe_3O_4$ | 200 phr $BaTiO_3$ | 3 | 41 |
| 57 | 150 phr $Fe_3O_4$ | 75 phr $BaTiO_3$ | 12.7 | 42 |
| 58 | 100 phr $Fe_3O_4$ | 50 phr $BaTiO_3$ | 4.3 | 43 |

$MoS_2$ and Mixtures using it

The following fillers were added to the polymer base and the voltage-current characteristics determined as described above.

TABLE V

| Example No. | Fillers and Loading | γ | Graph No. |
|---|---|---|---|
| 59 | 200 phr $MoS_2$ | 3.8 | 44 |
| 60 | 300 phr $MoS_2$ | 3.3 | 45 |
| 61 | 300 phr $Fe_3O_4$ + 5 phr $MoS_2$ | 3.75 | 46 |

Other Fillers

Results using other suitable fillers are given in Table VI and graphs 47 to 58. The fillers were added to the polymer base and the voltage-current characteristics determined as described above.

TABLE VI

Miscellaneous Fillers

| Example No. | Filler Loading | γ | Graph No. |
|---|---|---|---|
|  | Fast Black 100 |  |  |
|  | (50% $Cr_2O_3$, 40% $Fe_2O_3$, 10% CuO) |  |  |
| 62 | 300 phr | 6.8 | 47 |
| 63 | 400 phr | 8.3 | 48 |
|  | Copper Chromite |  |  |
| 64 | 300 phr | 1.6/3.8 | 49 |
|  | Cobalt Ferrite |  |  |
| 65 | 300 phr | 4.9 | 50 |
|  | Manganese Tetroxide |  |  |
| 66 | 300 phr (99.9% purity) | 2.1 | 51 |
| 67 | 300 phr (90% purity) | 1/1.75 | 52 |
| 68 | 200 phr (90% purity) | 1.75 | 53 |
|  | Impurity unknown, possibly $MnO_2$ |  |  |
|  | Copper Manganite |  |  |
| 69 | 300 phr | 1.3/2.0 | 54 |
| 70 | 200 phr | 1.5 | 55 |
| 71 | 150 phr | 7.2 | 56 |
| 72 | 100 phr | 12 | 57 |
| 73 | 190 phr | 4.1 | 58 |

Effect of polymer Base

It has been noted that the base polymer has a large effect on the non-linear behaviour of a given system and this is probably due to contributions of the polarity of the polymer and/or contributions from catalyst residues. The effects of using different polymers with a given filler were determined and the results were given in Tables VII, VIII and IX and in graphs 59 to 87.

TABLE VII

Filler: FW 17134. All 300 phr on 100 phr polymer

| Example No. | Polymer | γ | Graph No. |
|---|---|---|---|
| 74 | DYNH | 1.45 | 59 |
| 75 | DPD 6169 | 5 | 60 |
| 76 | DQDE 1868 | 2.8 | 61 |
| 77 | Royalene 502 | 10 | 62 |
| 78 | Royalene 611 | 8 | 63 |
| 79 | Royalene 512 | 7.5 | 64 |
| 80 | Royalene 301T | 10 | 65 |
| 81 | Royalene 1812 | 6 | 66 |
| 82 | Royalene 400 | 9 | 67 |
| 83 | Surlyn A | 6.25 | 68 |
| 84 | Hypalon 45 | 2.0/5.6 | 69 |

DQDE 1868 is an ethylene-vinyl acetate copolymer made by Union Carbide containing 18% vinyl acetate having a MFI of 2.5. Royalene 502 is an ethylene (60%)—propylene (40%) copolymer having a Mooney viscosity of 62 and an iodine number of 10. Royalene 512 is an ethylene (~70%)—propylene (~30%) having a Mooney viscosity of 90. Royalene 1812 is a copolymer of ethylene and propylene thought to contain about 80% ethylene. Royalene 400 is an ethylene (~65%) propylene (~35%) copolymer oil-extended rubber. Surlyn A is an ionomer of ethylene-acrylic acid neutralized by either sodium or zinc available from the Dupont Corporation. Hypalon 45, available from Dupont, is a chlorosulfonated polyethylene having a chlorine content of 25%, a sulfur content of 1%, a specific gravity of 1.07 and a Mooney viscosity of 40.

TABLE VIII

Filler: BK 5099. All 300 phr on 100 phr polymer

| Example No. | Polymer | γ | Graph No. |
|---|---|---|---|
| 85 | DPD 6169 | 5 | 70 |
| 86 | Royalene 611 | 15 | 71 |
| 87 | Royalene 512 | 15.6 | 72 |
| 88 | Royalene 1812 | 6.8 | 73 |
| 89 | DQDE 1868 | 3 | 74 |
| 90 | DYNH | 1.5 | 75 |
| 91 | Royalene 400 | 6 | 76 |

TABLE IX (a)

$Co_3O_4$. All 300 phr on 100 phr polymer

| Example No. | Polymer | γ | Graph No. |
|---|---|---|---|
| 92 | DYNH | 2.3 | 77 |
| 93 | DPD 6169 | 2.1 | 78 |
| 94 | DQDE 1868 | 1.84 | 79 |
| 95 | Hypalon 45 | 4.9 | 80 |
| 96 | Royalene 611 | 7 | 81 |
| 97 | Royalene 1812 | 10 | 82 |
| 98 | Royalene 512 | 10.2 | 83 |

TABLE IX (b)

| Example No. | Filler | Polymer | γ | Graph No. |
|---|---|---|---|---|
| 99 | FW 17134 | CPE 3614 | ~3 | 84 |
| 100 | BK 5099 | CPE 3614 | ~2.5 | 85 |
| 101 | BK 5099 | Viton AHV | 1.6 | 86 |
| 102 | FW 17134 | Viton AHV | 2.3 | 87 |

CPE 3614 is a chlorinated polyethylene containing 35% of chlorine and having a Mooney viscosity of 40. Viton AHV, available from Dupont, is a high molecular weight copolymer of vinylidene fluoride and hexafluoropropylene, having a viscosity of 180 and a specific gravity of 1.82.

The FW 17134 referred to in Table VII is a natural ground magnetic iron oxide and is available as a pigment from Ferro Limited.

Effect of $Fe_3O_4$ from different suppliers

In addition to observing differences in behaviour of the fillers with different base polymers, it has been found that nominally identical fillers from different suppliers also show very large variations in properties when mixed in the same base polymer. This effect is very well illustrated in Table X and graphs 88 to 95, which show variations using $Fe_3O_4$ from a variety of suppliers.

The base polymer had the following composition:

|  | Parts by Weight |
|---|---|
| Royalene 611 | 60 |
| DYNH | 16 |
| DPD 6169 | 24 |

-continued

|  | Parts by Weight |
|---|---|
| Agerite Resin D | 4 |
| Filler | 300 |
| Zinc Stearate | 4 |
| Triallyl Cyanurate | 1.5 |

TABLE X

| Example No. | Supplier | Filler | γ | Graph No. |
|---|---|---|---|---|
| 103 | Ferro | FW 17134 | 3 | 88 |
| 104 | Columbian Carbon Co. | Mapico Black | 5.5/2.25 | 89 |
| 105 | Pfizer | BK 5099 | 5.3 | 90 |
| 106 | Pfizer | Mo—4232 | 2 | 91 |
| 107 | Pfizer | Mo—8029 | 7.2 | 92 |
| 108 | Ferro | FW 1790 | 4.5 | 93 |
| 109 | Hopkins and Williams | PPtd.Fe$_3$O$_4$ | 1.3 | 94* |
| 110 | Bayer | 303T | 6.2 | 95 |

*Sample blew up at 800v i.e. puncture occurred.

MO-4232 is a magnetic iron oxide, Fe$_3$O$_4$, of spherical particle shape available from Pfizer Corporation. MO-8029 is a magnetic iron oxide, Fe$_3$O$_4$, of irregular particle shape, available from Pfizer. FW 1790 and FW 17134 are natural ground magnetic iron oxides available from Ferro Ltd. 303T is a mixed pigment, $\frac{2}{3}$Fe$_2$O$_3$ and $\frac{1}{3}$MnO$_2$, having a bixbyite structure available from Bayer. BK 5099 is a non-stoichiometric oxide of iron of the formula Fe$_2$O$_3$ 0.8FeO.

All formulations are shown to be non-linear but the degree of non-linearity varies widely between 1.3 and 7.2.

The reason for these large differences probably lies in the fact that the method of manufacture is primarily designed to produce a pigmentary product rather than a pure chemical.

The Pfizer product BK 5099 is a particularly pure product of the formula Fe$_2$O$_3$.0.8FeO.

Concentration Effects

The degree of non-linearity varies also with the amount of filler loaded into the base polymer and this effect was demonstrated for several materials. Table XI and graphs 96 to 102 give data for two different types of Fe$_3$O$_4$, namely, FW 17134 and BK 5099.

TABLE XI

| Example No. | Filler Loading | γ | Graph No. |
|---|---|---|---|
|  | FW 17134 |  |  |
| 111 | 300 phr | 3 | 96 |
| 112 | 200 phr | 5.9 | 97 |
| 113 | 100 phr | 4.1 | 98 |
| 114 | 250 phr | 5.9 | 99 |
|  | BK 5099 |  |  |
| 115 | 300 phr | 5.3 | 100 |
| 116 | 250 phr | 7 | 101 |
| 117 | 200 phr | 9 | 102 |

The data shows that the degree of non-linearity can be varied between 3 and 5.9 in the case of FW 17134 and 5.3 and 9 in the case of BK 5099. This type of variation may be regarded as typical for the effects of different loadings.

Magnesium and Zinc Ferrites

Magnesium and zinc ferrites supplied by the Columbian Carbon Company were loaded into the polymer base given below and the results are given in Table XII and in graphs 103 to 106.

| Polymer base | Parts by Weight |
|---|---|
| Royalene 611 | 60 |
| DYNH | 16 |
| DPD 6169 | 24 |
| Agerite Resin D | 4 |
| Zinc Stearate | 4 |
| Triallyl cyanurate | 1.5 |

TABLE XII

| Example No. | Loading | Filler | γ | Graph No. |
|---|---|---|---|---|
| 118 | 300 phr | Mg Ferrite | 2.8 | 103 |
| 119 | 200 phr | Mg Ferrite | 3.9 | 104 |
| 120 | 300 phr | Zn Ferrite | 1.79 | 105 |
| 121 | 200 phr | Zn Ferrite | 4.17 | 106 |

These results show the materials to be non-linear.

Mixtures of Fe$_3$O$_4$ and Co$_3$O$_4$

Mixtures of Fe$_3$O$_4$ and Co$_3$O$_4$ were loaded into the following polymer base.

|  | Parts by Weight |
|---|---|
| Royalene 611 | 60 |
| DYNH | 16 |
| DPD 6169 | 24 |
| Agerite Resin D | 4 |
| Zinc Stearate | 4 |
| Triallyl cyanurate | 1.5 |

The results are shown in Table XIII, and in graphs 107 to 116.

TABLE XIII

| Example No. | phr BK 5099 | phr Co$_3$O$_4$ | γ | Graph No. |
|---|---|---|---|---|
| 122 | 270 | 30 | 5.6 | 107 |
| 123 | 240 | 60 | 6 | 108 |
| 124 | 210 | 90 | 5.5 | 109 |
| 125 | 180 | 120 | 7.2 | 110 |
| 126 | 120 | 180 | 6 | 111 |
| 127 | 90 | 210 | 5.4 | 112 |
| 128 | 60 | 240 | 5.2 | 113 |
| 129 | 30 | 210 | 5.4 | 114 |
| 130 | 150 | 150 | 7.6 | 115 |
| 131 | 0 | 300 | 4.45 | 116 |

Again all the materials exhibited marked non-linear behaviour.

EXAMPLE 132

The following material was compounded on a 40″ twin roll mill at about 110° C.:

|  | Parts by weight |
|---|---|
| Royalene 611 | 60 |
| DYNH | 16 |
| DPD 6169 | 24 |
| Agerite Resin D | 4 |
| Triallyl cyanurate | 2 |

-continued

| | Parts by weight |
|---|---|
| Zinc Stearate | 4 |
| BK 5099 | 300 |
| Molybdenum disulphide | 5 |

The resulting material was granulated and extruded to produce a tube of the following dimensions:

| Internal diameter | 0.430 inches (1.08 cm) |
|---|---|
| Wall thickness | 0.075 inches (0.19 cm) |

The extrusion conditions, on a 2½ inch (6.3 cm) extruder, having an L/D ratio of 25:1 were:

| Zone | 1 | 2 | 3 | 4 | 5 | Head 1 | Head 2 |
|---|---|---|---|---|---|---|---|
| Temperature °C. | 80 | 90 | 100 | 110 | 120 | 130 | 120 |

The tubing was then irradiated using 5.8 MeV electrons to a total dose of approximately 12.5 Mrads after which the tubing was found to have a 100% Modulus at 150° C. of 4–6 Kg/cm$^2$. This material had a $\gamma$ value of 5.0 and the full current-voltage stress plot is given in FIG. 31.

This tubing after expansion to a diameter of 1 inch (2.54 cm) was used to terminate a number of high voltage power cables by heat shrinking with a propane gas torch as outlined below:

(a) 20 KV polyethylene insulated cable, type A2YHSY, 50 mm$^2$ conductor, of 5.6 mm insulation thickness. The detailed construction of this cable is shown in FIG. 28, in which the reference numerals have the following meanings:

| 281 | PVC SHEATH |
|---|---|
| 282 | WRAP of Mylar or plain cloth |
| 283 | COPPER WIRE SCREEN with copper contact strip. |
| 284 | SEMI-CONDUCTING LAYER (impregnated paper and cloth) |
| 285 | GRAPHITE COATING |
| 286 | INSULATION (polyethylene, or cross linked polyethylene) |
| 287 | STRESS RELIEF LAYER (conducting polyethylene or cross linked polyethylene) |
| 288 | CONDUCTOR |

The cable was terminated as illustrated in FIG. 29 of the accompanying drawings, wherein the layers of the construction are stripped as shown. A length of the tubing 289 was shrunk over the stripped cable, extending over 23 cm of the insulating layer 286, and overlapping on to the layer 282. The cable was then tested as illustrated in FIG. 27, with the following results:

| | Discharge magnitude pC | Applied Voltage (KV r.m.s) |
|---|---|---|
| Initially | <0.5 | 50 |
| After 21 days heat cycling | 5 | 27 |

The heat cycling was carried out, using a continuously applied voltage of 40 KV, and passing current such that the sheath of the cable reached 70° C. for 6 hours, followed by cooling to ambient temperature for 6 hours and then reheating the cable for a further period of 6 hours etc.

The impulse strength of the termination was determined in accordance with B.S. 923 with the following results:

| | Impulse Strength KV |
|---|---|
| Initially | 135 |
| After 21 days heat cycling | >200 |

These results taken together indicate the good stress control provided by the tubing made according to the invention.

(b) 10 KV PVC insulated cable, 50 nm$^2$ conductor, 3 mm insulation thickness. The construction of this cable is as shown in FIG. 28, except that the layer 284 is simply impregnated paper and layers 286 and 287 are polyvinyl chloride rather than polyethylene.

Using an 8 cm. length of the tubing according to the invention and covering with a non-tracking heat shrinkable tubing 290 made according to Example 8, sample No. 44 of British Pat. No. 1,337,951, the regions below the ends of the tubing being covered with a sealant (not shown), the following results were obtained:

| Discharge Magnitude, pC | Applied Voltage (KV r.m.s.) |
|---|---|
| 0.3 | 22.5 |
| 0.6 | 29 |
| 0.6 | 37 |
| 0.6 | 50 |

The impulse strength determined to BS 923 was found to be 105 KV.

This example demonstrates the good stress control afforded by the tubing, even at a voltage 9 times that at which the cable normally operates (5.8 KV r.m.s.).

Further experiments were carried out on a similar loop of cable, without the outer layer of non-tracking tubing, to determine the effect of length of the stress control layer.

The results were as follows:

| Effective length of stress control tubing. cm | Applied Voltage required for 5 pC max discharge |
|---|---|
| 1 | 7 |
| 2 | 16 |
| 5 | 27 |
| 10 | 30 |
| 20 | 31 |
| 25 | 31 |

(c) 25 KV XLPE 2/0 conductor size concentric neutral cable, with extruded screen as shown in FIG. 30, in which the reference numerals have the following meanings:

| 301 | SCREEN of thick tinned copper wire |
|---|---|
| 302 | EXTRUDED CONDUCTING XLPE LAYER |
| 303 | INSULATION XLPE |
| 304 | STRESS RELIEF LAYER (conducting PE) |
| 305 | CONDUCTOR |

Using a conductive paint over 2 cm of dielectric from the end of the screen (of volume resistivity approx. 10 Ωcm.) and a 25 cm. length of the above stress control tubing, the following results were obtained:

|  | Discharge magnitude pC | Applied Voltage KV r.m.s. |
| --- | --- | --- |
| (a) before heat cycling | 0 | 25 |
|  | 0.3 | 33.5 |
|  | 0.3 | 40 |
|  | 0.6 | 45 |
|  | 2 | 50 |
| (b) after heat cycling | 0 | 25 |
|  | 2.5 | 35 |
|  | 2.5 | 40 |
|  | 5.5 | 45 |
|  | 10 | 50 |

The heat cycling consisted of 18 cycles each of 4 hrs. heating to 65° C. on the screen of the cable, +4 hrs. cooling to ambient and during the total cycling period a voltage of 29 KV r.m.s. was applied.

These results further illustrate the good stress control provided by the tubing of the invention.

EXAMPLE 133

The following formulation was compounded as already described:

|  | Parts by Weight |
| --- | --- |
| Royalene 611 | 60 |
| DYNH | 16 |
| DPD 6169 | 24 |
| Agerite Resin D | 4 |
| Triallyl cyanurate | 2 |
| Zinc Stearate | 4 |
| BK 5099 | 300 |
| Vulcan XXX Special | 5 |

This material was processed into heat shrinkable tubing in the manner already described. The tubing so produced had an internal diameter of 1.75 cm and a wall thickness of 0.26 cm. It was expanded to an internal diameter of 4.32 cm.

Figure 31:
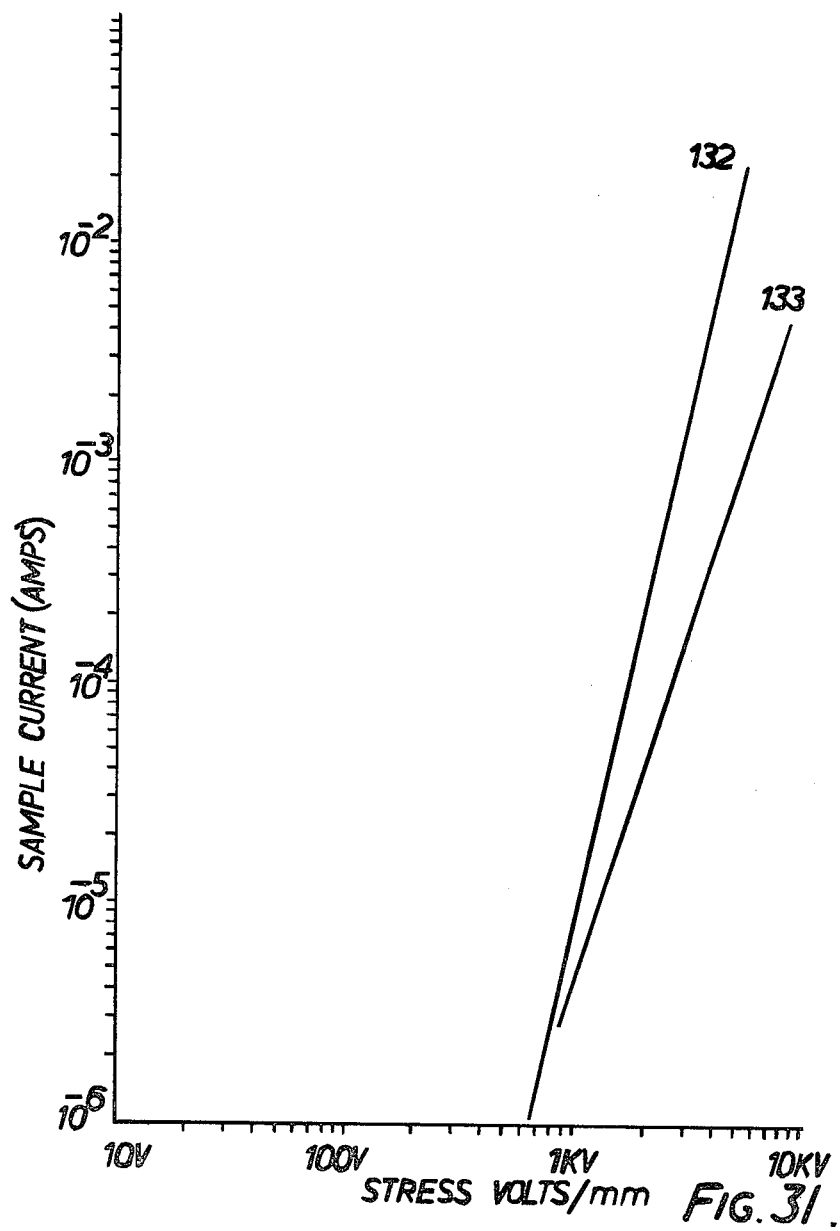

This material had a γ value of 3.7 and the current voltage stress plot is given in FIG. 31.

The tubing was used to terminate a 20 KV XLPE cable, construction as per diagram 2 and having a conductor cross sectional area of 150 mm². The cable designation was A2XHSY. The insulation thickness was 5.6 mm and the cable termination was in accordance with FIG. 29, the effective length of the stress control layer being 23 cms.

The cable termination was heat cycled or 6 days at a continuous voltage of 40 KV, to 90° C. on the cable jacket for 2½ hours, followed by cooling to ambient temperature for 2½ hours.

The principal electrical properties of the termination were:

|  | Discharge Magnitude pC | Applied Voltage KV r.m.s. | Impulse Strength KV |
| --- | --- | --- | --- |
| Initially | 5 | 23 | 160 |
| After heat cycling | 5 | 24 | 190 |

These results show the good stress control provided by the tubing.

Figure 32:
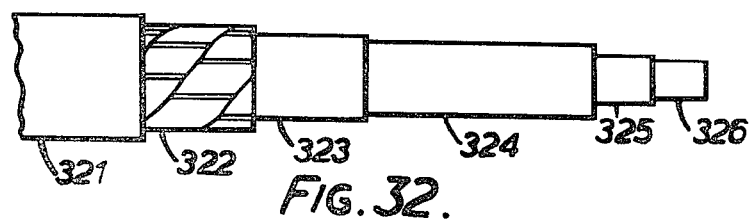

This tubing was further evaluated on a 20 KV XLPE cable, of conductor size 35 mm² and insulation thickness 5.6 mm. The construction of this cable is given in FIG. 32 in which the reference numerals have the following meanings:

| 321 | SHEATH (PVC) |
| --- | --- |
| 322 | COPPER TAPE SCREEN |
| 323 | SEMICONDUCTING LAYER (Conducting XLPE) |
| 324 | INSULATION XLPE |
| 325 | STRESS RELIEF LAYER (Conducting XLPE) |
| 326 | CONDUCTOR |

It was terminated as shown in FIG. 29 using a total termination length of 330 mm and an effective length of the stress grading layer of 230 mms.

The discharge levels were measured before and after impulse testing and were found to be as follows:

|  | Discharge Magnitude pC | Applied Voltage KV r.m.s. |
| --- | --- | --- |
| Initially | 0 | 30 |
|  | 1 | 37 |
| After Impulse testing | 0 | 29 |
|  | 1 | 35 |

The impulse testing consisted of 5 pulses of positive polarity only at each of the following voltages: 100, 110, 125, 140, 150, 160, 170, 180, 190 and 200 KV. No flashover occurred and the testing was discontinued after reaching 200 KV.

Those results show the good stress control properties conferred by the tubing made according to the invention, both as regards corona discharge and impulse strength.

We claim:

1. In a high voltage electrical apparatus subject to electrical stress, the improvement comprising providing relief against said stress by a composition exhibiting a nonlinear electrical resistance with variation in voltage, said composition comprising a thermoplastic or elastomeric polymer having dispersed therein at least one particulate filler compound selected from the group consisting of:
   (a) compounds having a perovskite type crystal structure;
   (b) metal oxides and mixed metal oxides having an inverse spinel-type crystal structure; and
   (c) metal oxides and mixed metal oxides having a mixed spinel-type crystal structure, the total weight of said particulate compound or compounds being at least 10% based on the weight of the polymer and such as to give the composition a gamma value of at least 1.5 at some direct current stress between 0.01 and 10 kV/mm.

2. An apparatus as claimed in claim 1 wherein the particulate filler comprises stoichiometric or non-stoichiometric $Fe_3O_4$.

3. An apparatus according to claim 2 wherein the filler is non-stoichiometric $Fe_3O_4$ and comprises $Fe_2O_3$, 0.8 FeO.

4. An article according to claim 2 wherein the filler comprises a mixture of $Fe_3O_4$ and $Co_3O_4$.

5. An article according to claim 3 wherein the filler comprises a mixture of $Fe_3O_4$ and $Co_3O_4$.

6. An article according to claim 2 wherein the filler comprises a mixture of $Fe_3O_4$ and barium titanate.

7. An article according to claim 3 wherein the filler comprises a mixture of $Fe_3O_4$ and barium titanate.

8. An article according to claim 2 wherein the filler comprises a mixture of $Fe_3O_4$ and $MoS_2$.

9. An article according to claim 2 wherein the filler comprises a mixture of $Fe_3O_4$ and $MoS_2$.

10. An article according to claim 1 wherein the filler comprises a sintered blend of substantially 50% by weight $Cr_2O_3$, 40% by weight $Fe_2O_3$ and 10% by weight CuO.

11. An article according to claim 1 wherein the filler comprises a mixed oxide of iron, cobalt and nickel.

12. An article according to claim 1 wherein the filler comprises a synthetic magnetite comprising substantially 22% FeO and 77% $Fe_2O_3$.

13. An article according to claim 1 wherein the particulate filler is selected from the group consisting of strontium titanate, barium stannate and barium titanate.

14. An article according to claim 1 wherein the particulate filler is present in admixture with one or more particulate electrically conductive fillers.

15. An article according to claim 14 wherein the conductive filler is carbon black and the weight ratio of carbon black to polymer is at most 40:100.

16. An article according to claim 14 wherein the conductive filler is a metal powder and the weight ratio of metal powder to polymer is at most 100:100.

17. An article according to claim 14 wherein the metal powder is aluminum powder.

18. An article according to claim 14 wherein the filler comprises $Fe_3O_4$ in admixture with a metal powder.

19. An article according to claim 18 wherein the metal powder is selected from the group consisting of iron, aluminum, copper, manganese, chromium, lead, nickel, zinc and silver.

20. An article according to claim 14 wherein the filler comprises $Fe_3O_4$ in admixture with carbon black.

21. An article according to claim 14 wherein the filler comprises barium titanate in admixture with carbon black.

22. An article according to claim 1 wherein the particulate filler is present in admixture with silicon carbide.

23. An article according to claim 1 wherein the particulate filler is present in admixture with molybdenum disulphide.

24. An article according to claim 1 wherein the particle size of the particulate filler is less than 20 microns.

25. An article according to claim 24 wherein the said particle size is less than 5 microns.

26. An article according to claim 1 wherein the composition has a gamma value of at least 1.5 at a direct current stress between 0.1 and 5 kV/mm.

27. An article according to claim 1 wherein the polymer is an ethylene/propylene copolymer.

28. An article according to claim 1 wherein the polymer is cross-linked.

29. An article according to claim 1 wherein said composition is dimensionally unstable.

30. An article according to claim 29 wherein said composition is heat-shrinkable.

31. An article according to claim 1 which is an electric cable.

* * * * *